United States Patent [19]
Connor et al.

[11] Patent Number: 5,673,304
[45] Date of Patent: Sep. 30, 1997

[54] PROGRAMMABLE EMERGENCY COMMUNICATION SYSTEM INCLUDING AUTOMATIC DIALER

[75] Inventors: Larry W. Connor, Greensboro, N.C.; Tracy McKeithan, Athens, Ga.; David Lubin, Croton-On-Hudson, N.Y.; Thomas Seuberling, Kernersville, Ky.

[73] Assignee: AC Corporation, Greensboro, N.C.

[21] Appl. No.: 94,446

[22] Filed: Jul. 21, 1993

Related U.S. Application Data

[63] Continuation-in-part of Ser. No. 763,493, Sep. 23, 1991, abandoned.

[51] Int. Cl.$^6$ ........................... H04M 11/04
[52] U.S. Cl. ................ 379/45; 379/38; 379/102; 379/40
[58] Field of Search ........... 379/37–40, 42, 379/44, 45, 49, 357, 90, 110, 102, 104–107; 340/825.19

[56] References Cited

U.S. PATENT DOCUMENTS

| | | |
|---|---|---|
| 3,553,377 | 1/1971 | Jones . |
| 3,843,841 | 10/1974 | Rubinstein . |
| 3,881,060 | 4/1975 | Connell et al. . |
| 3,989,900 | 11/1976 | Dibner . |
| 4,064,368 | 12/1977 | Dibner . |
| 4,101,741 | 7/1978 | Kunstatter . |

(List continued on next page.)

FOREIGN PATENT DOCUMENTS

| | | | |
|---|---|---|---|
| 0037573 | 10/1981 | European Pat. Off. . | |
| 0096401 | 12/1983 | European Pat. Off. . | 379/51 |
| 0208080 | 1/1987 | European Pat. Off. . | |
| 3826243 | 8/1989 | Germany | 379/45 |
| 2051520 | 1/1981 | United Kingdom . | |
| 2166321 | 4/1986 | United Kingdom . | |

OTHER PUBLICATIONS

A. Lennstom, "Ericare", Ericsson Review, vol. 58, No. 2 (1981), pp. 96–100.

M.J. Stevenson, "Portable Transmitter For Use With A Terminal For Summoning Help", Western Eletric Technical Digest, No.68 (Oct. 1982), p. 27.

"Ericare Provides Link To The Outside World", Telephony (Oct. 24, 1983), pp. 28, 30.

Owner's Manual, "The Hasten 500–911", Hasten Systems (1987).

E.G. DeNigris et al., "Enhanced 911: Emergency Calling With A Plus", Bell Laboratories Records (Mar. 1980), pp. 74–99.

W.H. Sahm, "General Electric Optoelectronics Manual", The General Electric Company (1976), pp. 70–72.

*Primary Examiner*—Wing F. Chan
*Attorney, Agent, or Firm*—Ronald P. Kananen

[57] ABSTRACT

A programmable emergency communication system for dialing an emergency number, such as a number for a central station, a 911 exchange, or third parties, permits voice-to-voice communication between a home system and the called number. The home system automatically dials one of the stored telephone numbers in response to a signal from a hand held medallion, a signal from a sip/puff switch, a signal from a paddle switch, a signal from a smoke detector, or a signal from a front panel of the home system. The home system reports emergency signals and also reports non-emergency signals, such as a low battery condition, to the central station. The home system has many options which may be programmed to suit the particular desires of the user. The home system may be programmed by any telephone which has access to the telephone line to which the home system is connected. The central station receives data from the home system and can determine the subscriber ID, the device which initiated the call, and the battery level of the device. The central station can also distinguish between emergency and non-emergency calls. A printer at the central station prints a record of all data transmitted between the central station and the home system.

22 Claims, 16 Drawing Sheets

U.S. PATENT DOCUMENTS

| | | |
|---|---|---|
| 4,237,344 | 12/1980 | Moore . |
| 4,281,220 | 7/1981 | Frailey . |
| 4,284,849 | 8/1981 | Anderson et al. ......................... 379/38 |
| 4,310,726 | 1/1982 | Asmuth . |
| 4,371,751 | 2/1983 | Hilligoss . |
| 4,417,100 | 11/1983 | Carlson et al. . |
| 4,453,043 | 6/1984 | Zielinski et al. ......................... 379/357 |
| 4,465,465 | 8/1984 | Nelson ................................ 340/825.19 |
| 4,465,904 | 8/1984 | Gottsegen et al. ......................... 379/42 |
| 4,467,142 | 8/1984 | Rupp et al. . |
| 4,495,383 | 1/1985 | Lubin et al. . |
| 4,510,350 | 4/1985 | Wagner et al. . |
| 4,565,902 | 1/1986 | Phillipps . |
| 4,641,127 | 2/1987 | Hogan . |
| 4,647,914 | 3/1987 | Alexander . |
| 4,760,593 | 7/1988 | Shapiro et al. . |
| 4,821,027 | 4/1989 | Mallory et al. ............................ 379/51 |
| 5,305,370 | 4/1994 | Kearns et al. ............................ 379/45 |

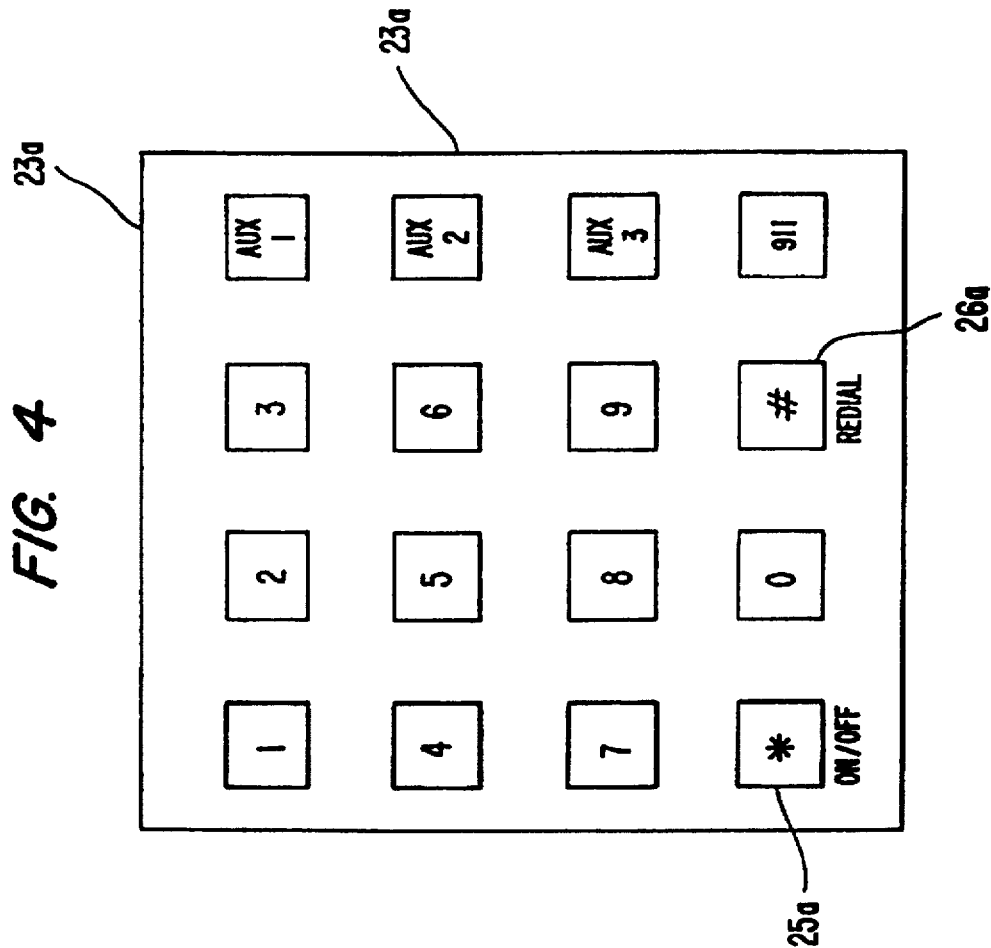
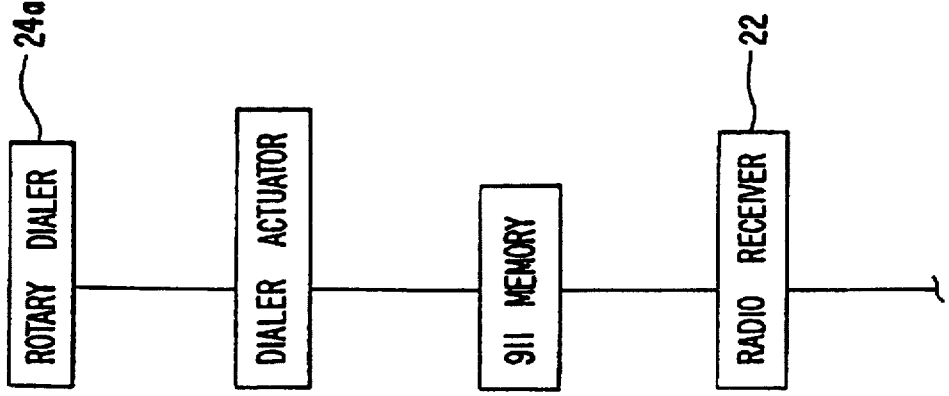

PROGRAMMABLE EMERGENCY COMMUNICATION SYSTEM INCLUDING AUTOMATIC DIALER

This is a continuation-in-part of application Ser. No. 07/763,493, filed Sep. 23, 1991, now abandoned.

BACKGROUND OF INVENTION

1. Field of the Invention

This invention relates to an emergency communication system. More particularly, this invention relates to a system which permits automatic dialing to an emergency number, such as the well-known 911 exchange, and voice communication by its user and a responder. Still more particularly, this invention relates to a speakerphone controller unit for controlling the operation of a locally or remotely-activated automatic dialer in combination with a speakerphone for user convenience.

A number of systems are known which are designed to provide assistance in an emergency situation and thus to ameliorate physical and emotional stress and reactions in humans experiencing emergencies of a physical or emotional (psychological) nature. Many of such systems involve the use of a telephone. Originally, a caller reported a situation to a dialed number, such as that of a police facility, ambulance service, or the like. While illness, accident, injury, and pain following surgery or hospitalization are examples of such situations, such events may be sufficiently incapacitating to inhibit access to a telephone by the injured person. For example, an incapacitating event, such as a fall, fracture, poison ingestion, and the like may cause a person who is otherwise unaccompanied and unattended to be unable to reach a telephone in the home for accessing the emergency network.

Technological advances have largely eliminated the need for a control operator with whom an able caller could communicate in an emergency situation. The 911 telephone system has been developed and used as a central station for receiving calls by or on behalf of a person needing assistance. However, in a usual situation, the usefulness of the 911 system is somewhat limited in that the caller must reach a telephone and subsequently dial the three digits and attempt to explain his problem to the 911 operator while holding the telephone. In some situations, the caller must also be able to receive a return call from either the 911 operator or an other designated responder in order to implement assistance depending upon the nature of the emergency.

An enhanced 911 system is known which automatically identifies the location of the caller and lists nearest assistance agencies. The system is similarly accessed by merely dialing the three digits.

In a system available from the applicant's assignee, automatic dialing equipment is provided to contact a central station staffed by personnel qualified to render assistance by telephone or dispatch assistance to a residence. Such a system and an automatic dialer are described in the patent literature, the disclosure of which is incorporated by reference for background. Other such systems are available in the United States under such marks as Lifeline, Lifecall, Companion, Medic Alert, and others. In each of these systems, digital automatic dialers are used which are programmed to activate a receiver and printer in the central station. Thus, each of these systems suffers from the inability to provide direct and immediate voice communication with the injured or person needing assistance and also provide limited access.

Accordingly, it is an aim in the art to provide a system which utilizes automatic dialers to access a central station in a normal manner to permit a two-way conversation with the caller. It is also a problem in the art to provide a system which permits a caller to access the telephone line from a remote location when injured or in an emergency.

Accordingly, it is an overall object of this invention to provide a system and suitable components which permit automatic dialing of an emergency number, such as 911, from any location in the home or adjacent facility by pressing a button on a miniature radio transmitter carried by a person, to establish two-way voice-to-voice communication with a 911 operator by way of a speakerphone.

It is another object of this invention to provide an emergency communication system which automatically terminates a call after a preset time interval to maintain the integrity of the residential telephone line to receive incoming calls from other responders.

It is another object of this invention to provide an emergency automatic dialing capability in a system which may automatically receive an incoming call from a responder after an initial emergency call is made to provide a speakerphone facility for responsive instructions.

It is a further object of this invention to provide an emergency automatic dialing system which has a plurality of selectable options so that the system can be programmed to suit a particular user's desires.

It is yet further object of this invention to provide an emergency automatic dialing system which can be activated easily by persons of varying skills, such as by persons with disabilities.

It is still a further object of this invention to provide an emergency automatic dialing system which responds to environmental conditions and which also reports non-emergency conditions.

It is another object of this invention to provide an emergency automatic dialing system which can be easily programmed and verified to ensure proper set up.

It is a further object of this invention to provide a system that uses a central station, the 911 system, or another third party, as backups for each other.

These and other objects will become apparent from the detailed description of the invention which follows, taken in conjunction with the accompanying drawings which together constitute the description of the invention.

BRIEF SUMMARY OF THE INVENTION

Directed to achieving the foregoing objectives, the system according to the invention includes the combination of an automatic dialer which is pre-programmed to dial an emergency number upon command from either a controller or a remote activator and a speakerphone for establishing voice-to-voice communication with the dialed emergency number. The automatic dialer may also be activated by a radio receiver in communication with a remote activator which may be carried by a person for initiating dialing from a location remote from the telephone or speakerphone. The system is under the control of a controller means which includes means for enabling or disconnecting the telephone system for operation in an emergency mode. The controller further includes means for automatically or manually enabling receipt of incoming calls. Moreover, the controller includes means for initiating emergency dialing of the preset designated number by the pre-programmed dialer so that a user may initiate emergency dialing by either pressing an emergency button on a controller console, or by pressing a button on a remote activator which is radio-linked to initiate the automatic dialing.

The controller includes circuit means for establishing a connection of a speakerphone with the telephone line and means for controlling an automatic answering function for connecting an optocoupler to the telephone line to permit the speakerphone to answer incoming calls automatically. Control means are provided in cooperation with the optocoupler for extending the length of or for disconnecting the automatic termination of the call upon command of the user. The controller further includes means for controlling emergency mode operation while enabling the system to receive incoming calls.

The controller for these functions include an optocoupler in circuit with a microprocessor and other circuit elements for simply, economically, and reliably controlling all of the foregoing functions.

In the preferred embodiment, the home system is programmable and comprises a speakerphone and an automatic dialer which is programmed to dial at least one telephone number in response to a first control signal. The telephone number may be that of a central station, a 911 exchange, or it may comprise a third party's number. The first control signal may be generated by a hand held medallion, a sip/puff switch, a paddle switch, a smoke detector, or it may be generated in response to the actuation of a switch on a front panel of the home system. Additionally, besides transmitting emergency signals to the central station, the home system can also transmit non-emergency signals, such as a low battery signal, to the central station.

The home system is reprogrammable so that a user may program the home system to suit his or her own particular desires. For instance, the options which a user may program comprise the option of having incoming calls automatically answered after a variable number of rings, being able to have more than one hand held medallion activate the home system, having the speakerphone muted during certain times, and whether the speakerphone may be placed in various modes of operation.

A central station of the invention detects an incoming call and automatically answers the call. An acknowledgement is sent back to the home system after the call has been answered and information indicating the subscriber's ID and indicating the device which activated the call are displayed at the central station. A printer at the central station prints a record of all data that is transmitted to the home system and all data that is received at the central station.

Preferably, the central station distinguishes between an emergency call and a non-emergency call and the printer prints a record of the duration of the call, the time of the call, and the date. Also, the central station preferably has a power up reset module for resetting the central station upon application of power and a line break monitoring module for detecting a break in the telephone line. Furthermore, the central station has various indicating means for informing an operator at the central station of various conditions, such as a non-emergency call, a line break, or an off-hook condition.

These and other features of the invention are described in greater detail in the written description of the invention.

BRIEF DESCRIPTION OF THE DRAWINGS

In the drawings:

FIG. 4 is an alternative remote activator having multiple channels for permitting additional remote dialing;

FIG. 5 is a block diagram similar to FIG. 1 for a rotary dialer system similar to the push-button dialer in FIG. 1;

DETAILED DESCRIPTION OF THE PREFERRED EMBODIMENT

Figure 1:
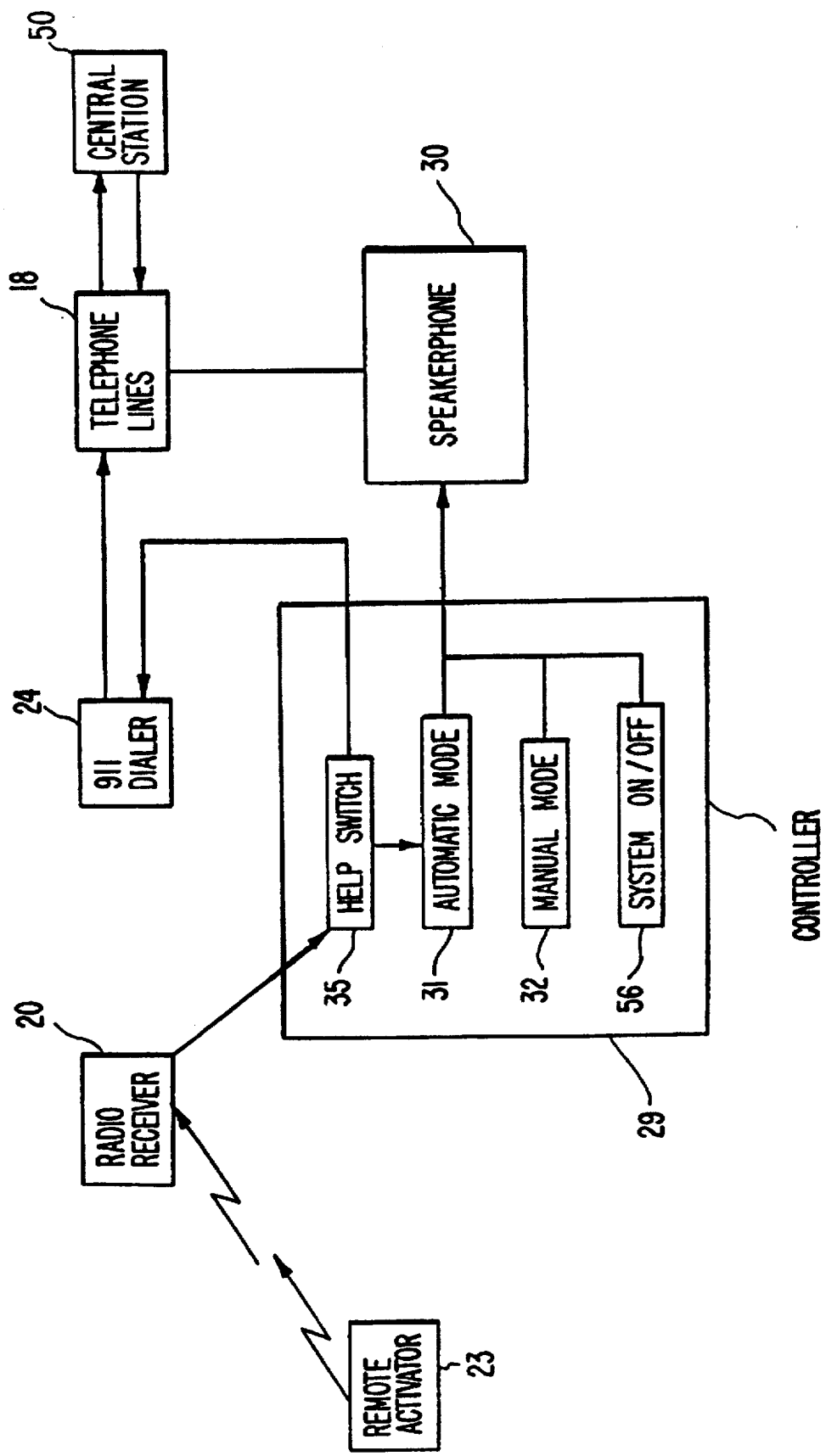
FIG. 1 is a block diagram of the components of the system for use in explaining the operation of the system under control by a controller according to the invention.
Figure 2:
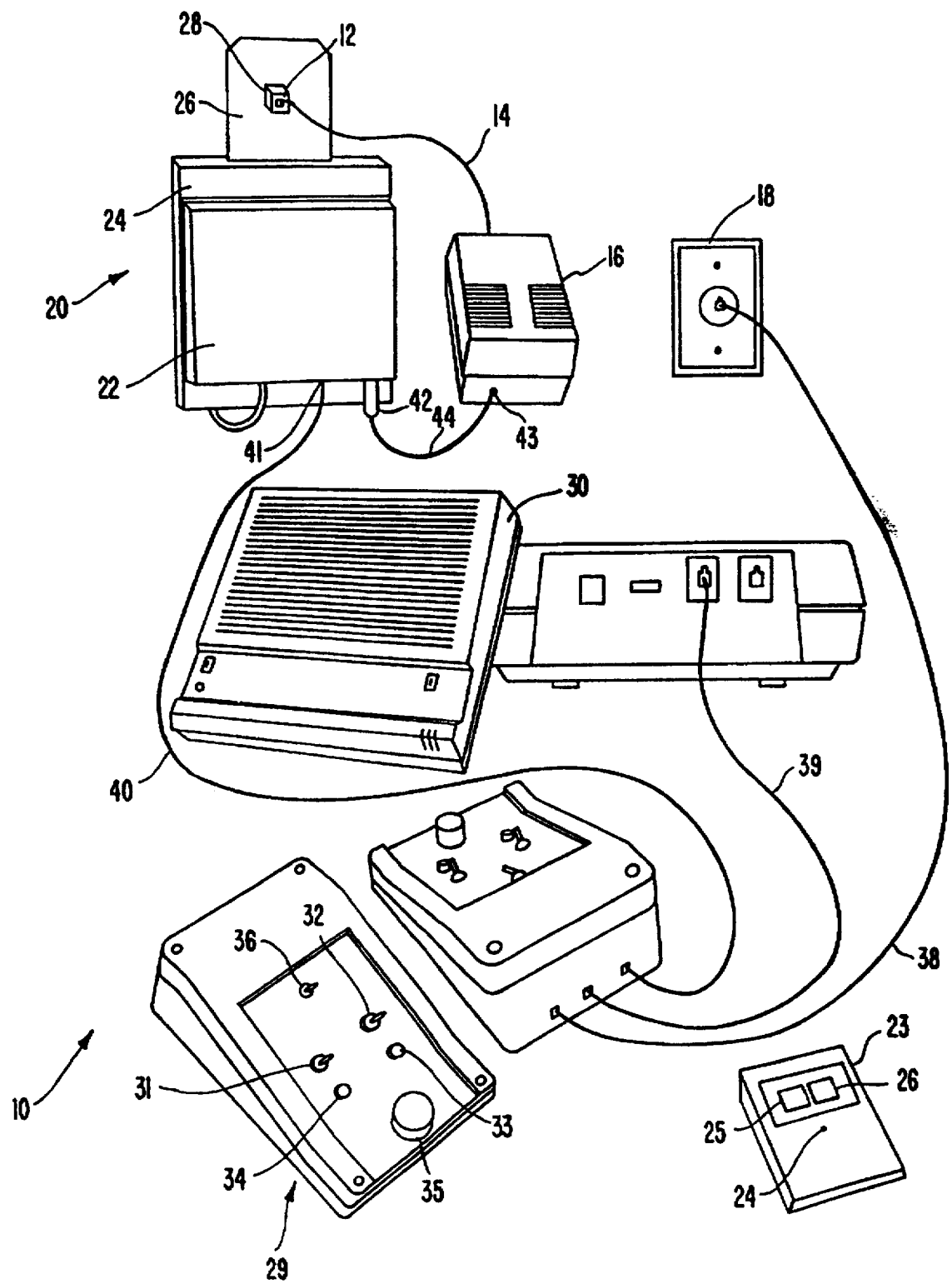
FIG. 2 is an assembly drawing of the system in pictorial form.

FIG. 1 illustrates a functional block diagram of the components according to the invention comprising a multi-function communication system including a controller 29 according to the invention. With the system shown in FIG. 1 an emergency call to a central station 50, such as to a 911 number, can be made from anywhere within a facility, without requiring the user to go near the telephone, by merely pressing a switch button to establish an automatically-dialed emergency two-way voice communication with the 911 center 50. The reference numerals used in FIG. 1 and in the installation diagram of FIG. 2 are used consistently to describe like elements. The system shown in FIG. 1 is directed to a touch-tone dialing network wherein the 911 number may be accessed only if the unit is in an idle, or standby state, referring to an absence of incoming calls.

Figure 3A:
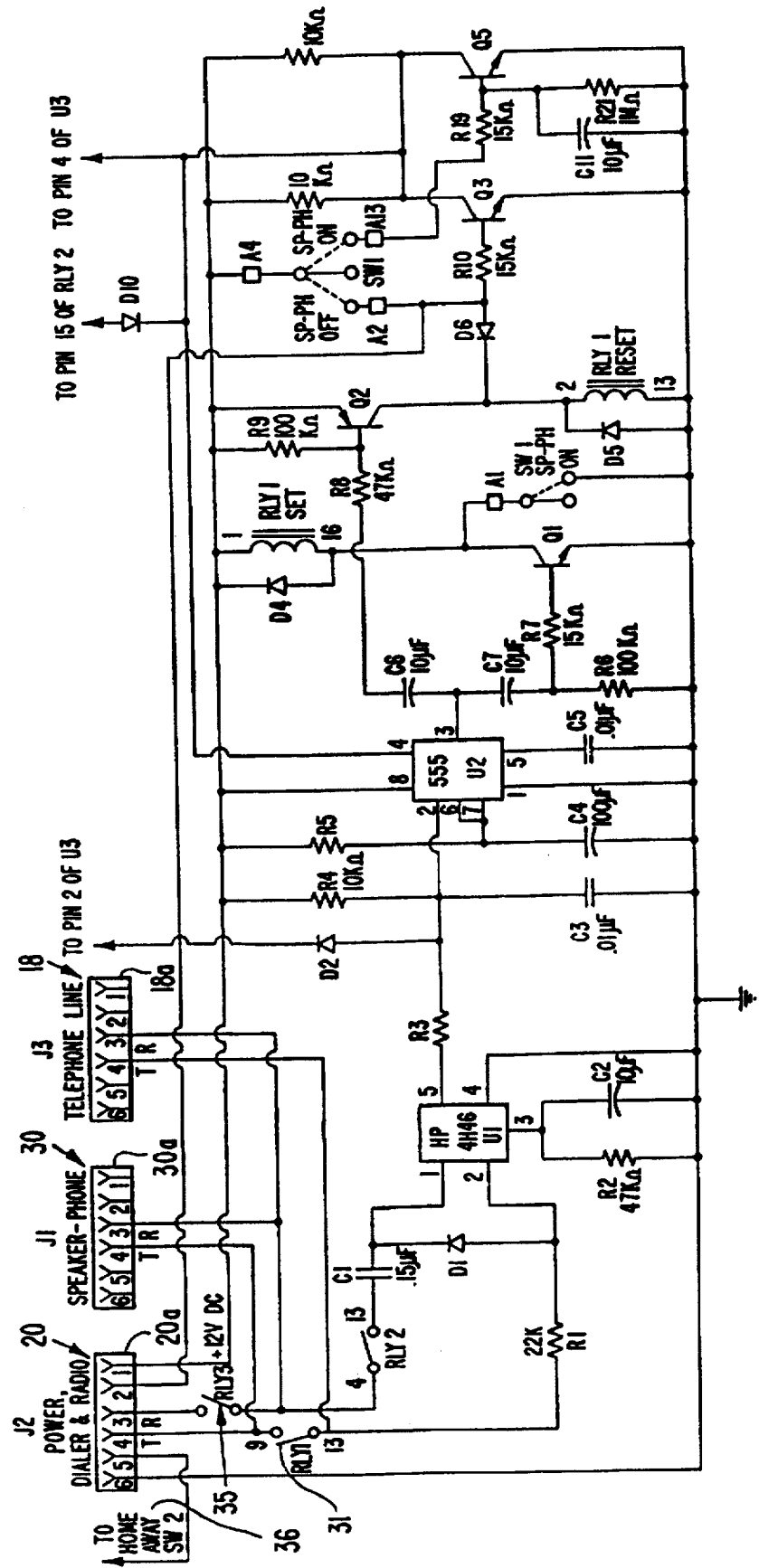
FIGS. 3A and 3B are interconnected circuit diagrams showing the circuitry in the controller according to the invention.
Figure 3B:
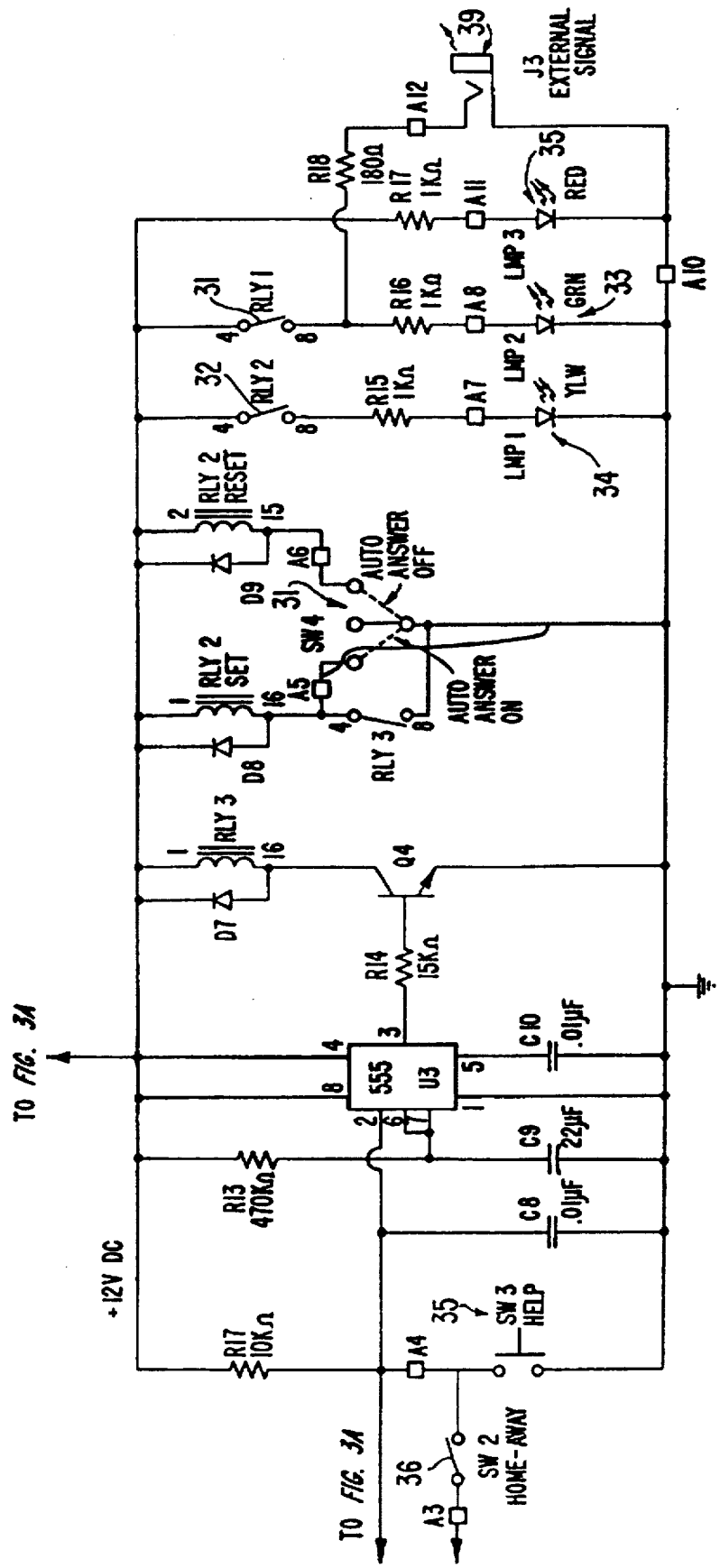

FIG. 2 shows an assembly diagram, partially in block form, showing the components of the communication system for making emergency calls from anywhere in a home, under the control of a versatile speakerphone controller, the circuits for which are shown in FIGS. 3A and 3B. The system is designated generally by the reference numeral 10 which permits an initiation of an emergency call, such as to a 911 emergency system 50, from anywhere in a home, for example, without requiring the caller to go near the telephone. The caller can simply press a button on either a controller module 29 or on a remote activator 23 to establish two-way voice communication with the emergency center 50.

The system 10 is connected to a conventional power source 12 by a conduit 14 to a power supply 16. The power supply 16 converts the power source, for example, 110 Volts AC to a 12 Volt DC supply for operating the circuit components of the system. A conventional modular telephone jack 18 is connected, as is customary, to an outside telephone network having a 911 access. A subassembly 20, comprising a radio receiver 22 and an automatic dialer 24 together secured to a mounting plate 26 having an opening 28 in register with a power source, is conveniently fastened to a wall of a dwelling. The radio receiver is conventionally connected through the controller console 29 to the automatic dialer as is well known in the art to initiate automatic dialing when commanded to do so by receipt of radio signals therefrom. A suitable programmable dialer is available from Zoom Telephone, Inc. under the trademark "HOT SHOT," while a suitable radio receiver is available from Linear Electronics. Such a combination of a radio receiver and an automatic dialer is formed from conventional components connected to perform their conventional functions. A speakerphone 30 such as is available from AT&T under the designation "Speakerphone 600" permits hands-free conversation by the user and is located at any convenient location. A remote activator 23 may initiate automatic dialing by the dialer 24 by transmitting RF signals 25 to be received by the radio receiver 22. In the embodiment shown in FIGS. 1 and 2, the two-channel remote activator 23 utilizes an "On" button 25 and an "Off" button 26 for activating emergency calls only. When so arranged, the dialer 24 is programmed to access only an emergency telephone network 50, such as the 911 system.

The system as described can be powered by batteries, making it usable during power outage situations, and is dial-tone activated for tone dialing operation. A rotary-dialed alternative is shown in the block diagram of FIG. 5.

The operation of the communication system 10 is controlled by a speakerphone controller console 29 for controlling the operation of the speakerphone 30. The speakerphone 30 may be operated in either an automatic answering mode or a manual answering mode under the respective controls of on/off switches 31 and 32. Preferably, the switches initiate or break contact by temporarily moving them to alternate positions which cooperate with relays in the controller circuit, as will be apparent from FIGS. 3A and 3B. The switch 32, for controlling operation of the system in a manual mode, turns on the speakerphone 30 when pressed to its "On" position to activate an indicator 33, for example, a green light, to indicate to the user the speakerphone 30 is in an active or ready state. On the other hand, the switch 31 controls operation of the system in an automatic answering mode. When the switch 31 is pressed to its "On" position, a visual indicator 34 is activated to indicate that the console is operating in its automatic mode, and is thus ready to receive all incoming calls automatically.

The console 29 includes an emergency visual indicator 35 combined with a "Help" switch which is illuminated when the power supply 16 is on to make the emergency system visible in a dark room and indicate the active state of the power supply. Depression of the "Help" switch 35 at the console 29 will also initiate automatic dialing of the 911 number.

The console 29 further includes an away/home switch 36 which is preferably moved to an "away" position when the user leaves the premises to eliminate the usually unlikely possibility of a spurious RF signal triggering a false 911 call. In normal operation, the switch 36 is positioned in its "home" position to place the remote activator 23 in its working mode.

As shown in FIG. 2, the console 29 is connected by a conduit 38 to the modular telephone jack 18 to receive incoming calls and to transmit outgoing calls. The console 29 is further connected by a conduit 39 to an input jack on the speakerphone 30, while a third output conduit 40 is connected to an input jack 41 on the radio receiver 22. A power jack 42 is connected to an output jack 43 of the power supply 16 by a conduit 44. A feature of the invention is its simplicity in operation and in installation, as well as its low cost.

When the system 10 is connected as shown in FIG. 2, and the switch 36 is in its "home" position, the system 10 is active and an emergency call can be made immediately if a life threatening or serious emergency occurs. Preferably, a person, such as a disabled or quasi-ambulatory person, carries the remote activator 23 on his person. If the individual is near the console 29, the emergency button 35 may be pressed directly to initiate an automatic dialing of the 911 emergency center 50 and complete a connection with the 911 operator. The 911 operator, when answering the call, is thus able to speak directly with the calling individual byway of the speakerphone 30. An advantage of the system 10 is that the person may activate voice communication with the emergency center 50 from the controller 30, or from any location, for example, by depressing the remote activator 23. In a location equipped with an "enhanced 911 system," a 911 operator will automatically know the telephone number, home address, and location of the nearest emergency facility for the individual activating the system by the remote activator 23. The communication with the 911 operator is of limited duration, under the control of the controller 29, so that the speakerphone 30 will automatically hang up to free the telephone service of the caller if the caller is physically unable to hang up manually. When the speakerphone 30 operates in a hang-up mode, the system is thus armed to automatically receive subsequent calls from other responders and permits automatic voice communication.

In operation, after depression of the emergency button 35 on the console 29 or the depression of the "On" switch 25 on the remote activator 23, the dialer 24 is automatically activated to dial the 911 center 50 or other emergency communication systems. At that time, the indicator 34 is turned on, indicating that the console 30 is in its automatic mode and will thus receive all incoming calls automatically. The user or caller can cancel the automatic mode by pressing the switch 31 or remote activator button 26 to turn off the indicator 34 and switch the controller 29 to its manual mode. If the caller wishes future calls to be received automatically, the console 29 is left in its automatic position with the indicator 34 on or the caller can depress the automatic switch 31.

A significant advantage of the system 10 shown in FIG. 2 when operating in the automatic mode is that, once an emergency call is initiated and the system is restored automatically to its on-hook position, other responders such as a poison control center, the caller's doctor, or relatives or friends, can call to talk to the caller even when the caller cannot physically reach the telephone. Wholly aside from the emergency connotations, when operating in the automatic mode, the system 10 also permits conventional operation of the speakerphone system as a convenience when the caller is busy doing other household or office tasks. Moreover, by controlling the automatic mode, the privacy of the caller is protected.

Thus, the system 10, and in particular the speakerphone 30, may be used for convenient everyday no-hands communication and, when desired by the user, will respond automatically to an incoming call by automatically responding, as is known in the speakerphone art, to a telephone ringing signal. The user may also turn on the speakerphone manually at the console or with the activator 23 while the telephone is ringing. Moreover, as previously explained, although the speakerphone will operate in an automatic hang-up mode after a predetermined period of time, such as two to eight minutes, those calls may be extended by activating the switch 32 to turn the speakerphone into a manual mode. Moreover, an appliance such as a light or sound emitting source may be plugged into the controller console 29 so that the user may know when a telephone call is arriving. That feature may also be used to assist in identifying the caller's home for emergency responders or visitors when that light signal is placed in the window of the calling source, for example.

To summarize the operations of the system 10 as shown in FIGS. 1 and 2, an emergency 911 call may be made by pressing the button 35 on the controller console 29 or by pressing the switch 25 on the remote activator 23. Incoming calls may automatically be received by pressing the switch 31 to activate the illuminator 34 and non-automatic speakerphone reception may be restored by pushing the switch 31 in its opposite direction. A ringing telephone may be answered remotely be pressing the "On" button on the activator 23, while the speakerphone 30 may be turned on for ordinary use by depressing the switch 32 to illuminate the light 33 to place the system in a manual mode. The speakerphone 30 may be turned off by pressing the switch 32 upwardly to turn off the switch 33. A battery for the remote activator 23 may be tested by pressing the "Off" switch 26 in the activator to check the light 24 on the remote activator.

FIGS. 3A and 3B, when viewed together, illustrate the circuit components in the speakerphone controller console 30, as shown in FIG. 1. In FIGS. 2 and 3, like reference numerals are used to indicate components as described in connection with FIG. 1. Thus, the manual operation switch 32 is described as switch SW1; the home/away switch 36 is described as switch SW2; the help switch 35 is described as switch SW3; and the automatic answering switch 31 is described as switch SW4. The help switch 35 is described as switch SW3; the indicator 31 is described as LMP1; the indicator 33 is described as LMP2; and the indicator on the help switch 35 is described as LMP3. The pin connections for power and for the automatic dialer 24 and radio receiver 22 on the console 20 are shown at a connector 20a, while the pin connectors for the speakerphone 30 are shown on the connector 30a. The connections on the modular telephone jack 18 are shown at the connector 18a. A 12V-DC positive bias for the circuit is obtained from pin 1 on the connector 20a, while a ground bias is connected to pin 6 on the connector 20a.

As shown in FIGS. 3A and 3B, manual operation of the speakerphone 30 is controlled by a relay RLY1 which controls connection of the speakerphone 30 to the telephone line at connector 18a. The relay RLY1 is set and the speakerphone 30 is connected manually by depressing the switch SW1 (32) to its "On" position. The transistor Q5 is activated through base-connected resistor R19 to provide a collector output signal to a reset pin 4 of the timer U2 and of the timer U3. At the same time, the set coil RLY1 in parallel with a diode D4 is energized, causing the relay RLY1 to close. Once depressed, the relay RLY1 will stay set indefinitely until reset by flipping the manual answer switch 32 to its "Off" position, or by pressing the "Off" switch 26 on the remote activator 23. When the relay RLY1 is set, an indicator, such as a green LED (LMP2) is lit, as shown in FIGS. 3A and 3B by the closure of relay RLY1. Thus, the system 10 will operate in a manual mode to receive normal telephone calls on a hands-free basis.

To operate the system 10 in an automatic answer mode, a relay RLY2 is set so that the system 10 will automatically answer a telephone call. The relay RLY2 is set manually by depressing the auto answer switch 31 (SW4) to its "On" position to activate a set circuit for relay RLY2 as shown in FIG. 3B. The set coil RLY2 in parallel with a diode D8 is thus energized by moving the automatic answering switch SW4 to its on position. The automatic answer function may be cancelled by changing the auto answer switch 31 to its "Off" position to activate the reset circuit to energize the RLY2 reset coil in parallel with a diode 9. When the system 10 is in an automatic answer mode, the indicator 34, preferably a yellow lamp LMP1, is illuminated by the closure of the relay RLY2 as shown in FIG. 3B, through the resistor R15.

When the relay RLY2 is closed, and the system 10 is thus in its automatic answer mode, an optocoupler U1 is connected to the telephone line through a blocking capacitor C1, diode D1, and resistor R1, as seen in FIG. 3A. The optocoupler U1 is connected to ground through a parallel circuit R2, C2 and its output is connected through a resistor R3 and a diode D2 to a timer U3, shown in FIG. 3B. The output of the optocoupler U1 is also connected to the junction of a resistor R4 and a capacitor C3 to provide an input to a timer U2 which is biased by a connection to a junction between a resistor R5 and a capacitor C4.

A capacitor C1 in circuit between the telephone line and the optocoupler U1 acts as a blocking capacitor to prevent DC voltage on the telephone line form triggering the optocoupler U1. When an AC ringing signal appears on the telephone line 18, the resistor R1 limits current flow, while the diode D1 shunts the negative voltage away from the LED inside the optocoupler U1. The ringing signal thus initiates the timing function.

When a ringing signal is received by the optocoupler U1, the voltage at pin 5 of the optocoupler U1 is switched low to trigger the timer U2 so that the normally low output of the timer U2 switches to a high value. The output of the timer U2 is provided through a capacitor C7 and a resistor R7 to the base of a transistor Q1 which, when activated, activates a set circuit for the relay which comprises a coil RLY1 and diode D4. That short pulse thus connects the speakerphone 30 to the telephone and answers the incoming calls.

When a capacitor C4, connected at the input side of the timer U2 has been charging for a predetermined time determined by the values of C4 and R5, for example from 75 seconds to eight minutes, the output of the timer U2 returns to a low value, thus turning the transistor Q2 on through a capacitor C6 and resistor R2. The base of the transistor Q2 is biased by a resistor R9, while its collector is connected to a reset circuit for the relay RLY1, comprising a coil RLY1 reset and diode D5. When the transistor Q2 is turned on, the speakerphone is disconnected and the call is hung up.

Anytime during the conversation, while the timer U2 is activated, the time of the call may be extended indefinitely by changing the switch SW1 to its "On" position. When the switch SW1 is switched to its "On" position, the collector of the transistor Q1 is connected to ground to activate the set circuit for the relay RLY1 and switches the reset at pin 4 of the timer U2 to ground to cancel the timer. Pulsing of the set coil of relay RLY1 again causes the speakerphone to remain connected. The call may be hung-up at anytime during a timed conversation by changing the switch SW1 to its "Off" position or by pressing the "Off" button on the remote activator to reset the timer and reset the relay RLY1.

The emergency mode operation, under the control of the "Help" switch 35, will now be described. When the "Help"

switch 35 (SW3) is pressed, the timer U2 is triggered, causing the speakerphone 30 to be connected to the telephone line 18 as described above. In addition, the timer U3 is triggered causing the normally low output at pin 3 to switch to a high value, thus triggering the transistor Q4 to activate a relay set circuit RLY3 and diode D7 to set the relay RLY3 to turn the system into an automatic answer mode. After a period determined by the time constant of the resistor R13 and capacitor C9, for example 11.4 seconds, the output of the timer U3 at pin 3 will switch back to low and the automatic answer may be cancelled. The relay circuit RLY3 also connects the automatic dialer to the telephone as shown in FIG. 2. Thus, after a predetermined period of time, such as about 11.4 seconds, the relay RLY3 will release and disconnect the dialer from the telephone line by pressing the "Help" switch 35 on the remote activator 23, the same sequence will be initiated if the switch SY2 is in its home position.

Thus, FIGS. 3A and 3B illustrate a convenient circuit using an optocoupler U1 with two timers U2, U3 in circuit with three relays RLY1, RLY2 and RLY3 and associated components for performing the functions of the system 10.

If desired, the remote activator 23 may be a multi-channel device 23a cooperating with a multi-channel radio receiver 20a. A keypad 70 may be used for remotely dialing a number of choice to the user in addition to the emergency 911 dialing described above. For example, a 16-pad network could also be used, where * and # act as on/off channels 25 and 26.

FIG. 5 shows a similar system for actuating a rotary dialer through a programmed actuator to initiate emergency 911 system. Otherwise, the operation of the system is similar to that described above.

Figure 6:
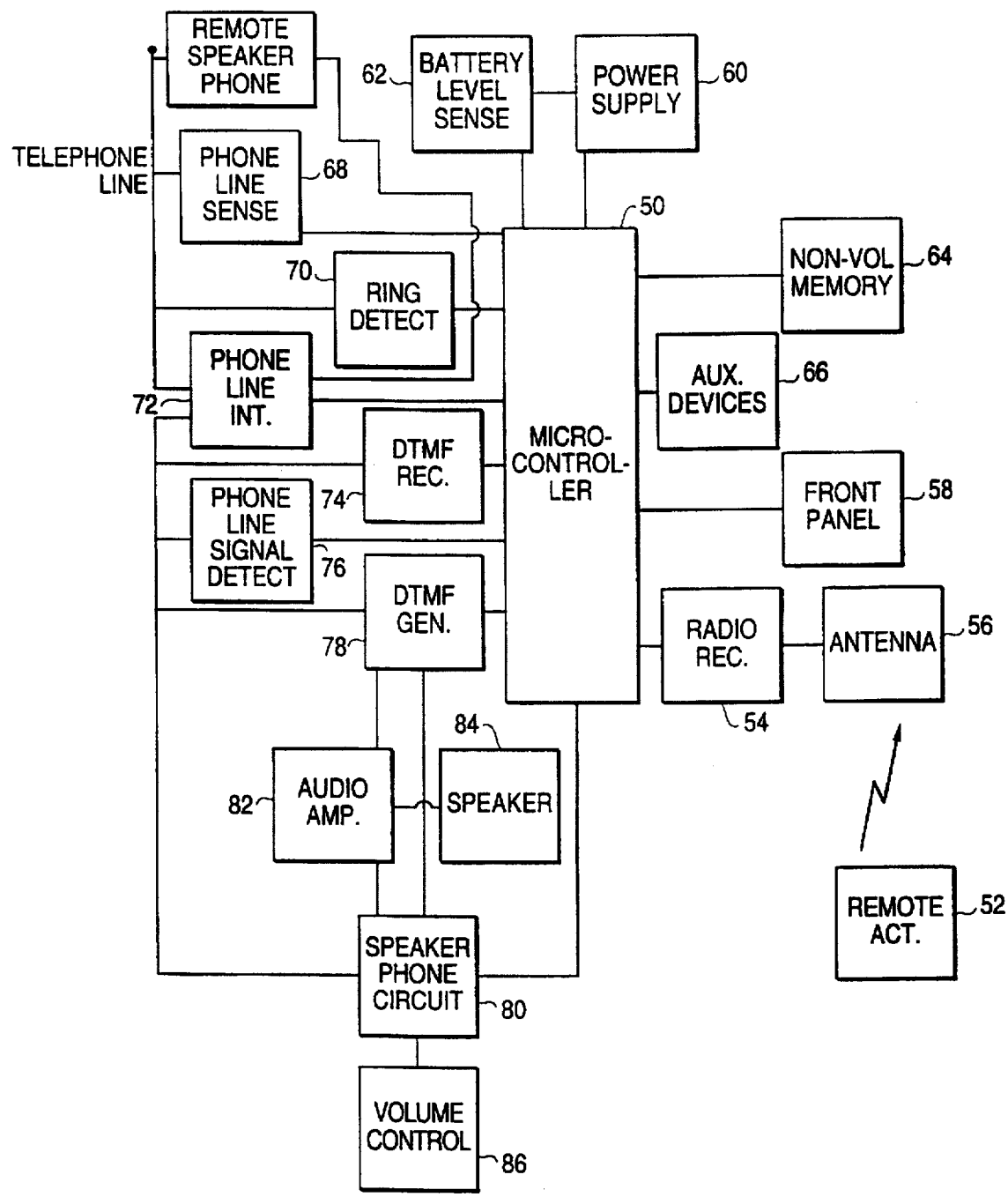
FIG. 6 is a block diagram illustrating a preferred embodiment of the home system.

A preferred embodiment of a home system is shown in a block diagram in FIG. 6. In this embodiment, a signal received from a remote activator 52, the manual activation of a "Help" switch on a front panel 58 of the system, or a signal received from an auxiliary device 66 will cause the home system to call one or more designated numbers, such as a central station, a 911 exchange, or a third party, and provide direct two-way voice communication with a person on the other line. Alternatively, if the telephone is ringing, the receipt of one of these signals will cause the home system to automatically answer the call. The home system comprises a speakerphone 84 to allow for hands-free communication.

The home system comprises a controller 50 powered by a power supply 60 which converts household AC power into a regulated DC power supply. The power supply 60 supplies a regulated 12 volts DC and a regulated 5 volts DC to other components of the system and has a backup 9 volt battery in case of power failure.

A battery level sense circuit 62 monitors the level of the backup 9 volt battery and informs the controller 50 if the battery falls down to a first threshold, such as 8 volts and if it falls down to a second threshold, such as 7.5 volts. If the battery level is at the first threshold, the battery level sense circuit 62 informs the controller 50 that the battery is weak and when the battery level falls down to the second threshold, the circuit 62 informs the controller 50 that the battery needs replacing.

Figure 11:
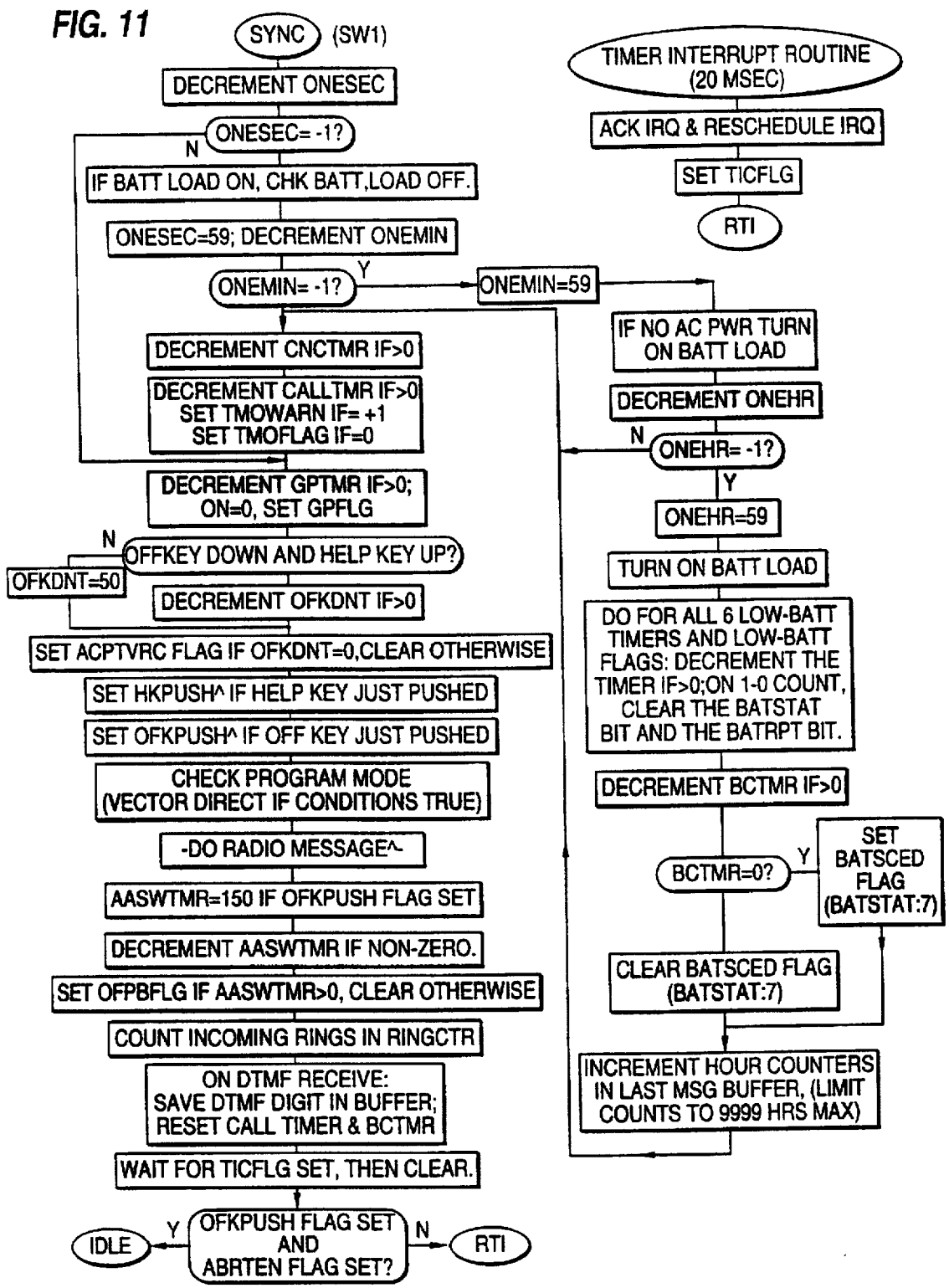
FIG. 11 is a flow chart illustrating the steps taken by the home system in checking the battery level.

A flow chart generally describing the steps taken by the home system in performing the battery check is illustrated in FIG. 11. In summary, the battery level sense circuit 62 performs the battery level check every time the system has been activated by either a signal received from the remote activator 52, from the throwing of the "Help" switch on the front panel 58, or from one of the auxiliary devices 66. If the system has not been activated by one of these signals, the battery check is performed once every hour. When the system receives its power from the backup battery, the frequency of the battery check is increased to one check every minute.

The home system is connected to a telephone line and the controller 50 determines the condition and usage of the telephone line with a phone line sense circuit 68. The phone line sense circuit 68 monitors the tip and ring (T/R) voltage and informs the controller 50 whether no phone is currently in use, whether a phone is off hook, whether the home system is connected to the telephone line, and whether there is a line break.

A ring detect circuit 70 is connected to the telephone line and also to the controller 50. The ring detect circuit 70 detects a ringing telephone signal on the telephone line and informs the controller 50 of the receipt of a ring each time a ringing signal is sent over the telephone line.

The controller 50 is also connected to the telephone line through a telephone line interface 72. Through the telephone line interface 72, the controller 50 is able to seize the telephone line in order to dial a number or answer an incoming telephone call. The telephone line interface 72 can also mute the speakerphone 84 by disconnecting the power supplied to a speakerphone circuit 80.

The dialing of the telephone number is performed with a dual tone multiple frequency (DTMF) generator 78. The DTMF generator 78 produces tones in accordance with data signals and clocking signals supplied by the controller 50. The DTMF generator 78 supplies its output to the speakerphone circuit 80 and also to an audio amplifier 82. Besides using the DTMF generator 78 to produce tones conforming to the DTMF standard for dialing telephone numbers, the DTMF generator 78 is used to provide confirmation beeps and other tones during the programming of the home system.

The home system also comprises a DTMF receiver 74. The DTMF receiver 74 receives and decodes DTMF tones present on the telephone line for the controller 50. The DTMF receiver 74 receives and detects these tones during the programming of the home system, during a configuration and set up inquiry, and during communication with a central monitoring station.

The controller 50 has nonvolatile memory 64 for storing data, such as system configuration and set up parameters, phone numbers, a user id, and residence codes. The nonvolatile memory 64 is preferably a programmable erasable read only memory (PROM) which prevents programmed data from being lost when the system is powered down or when the battery is being replaced.

The speakerphone circuit 80 is preferably a voice switched speakerphone device which incorporates the necessary amplifiers, attenuators, level detectors, and control algorithm to form a high quality hands-free speakerphone system. Also, the speakerphone circuit 80 preferably has a microphone amplifier with an adjustable volume control 86 and mute control, transmit and receive attenuators which operate in a complementary manner, level detectors at both input and output of both of the attenuators, and background noise monitors for both the transmit and receive channels. A dial tone protector prevents the dial tone from being attenuated by the receive background noise monitor circuit.

The audio amplifier 82 receives and amplifies signals from both the DTMF generator 78 and the speakerphone circuit 80 and then drives the speakerphone 84 with the amplified signals. The audio amplifier 82 may be disabled by the controller 50, for example, when the speakerphone 84 is muted, during the beginning of an emergency call, or as programmed.

The controller 50 has an antenna 56 and a radio receiver 54 for receiving signals from the remote activator 52. The remote activator 52 may comprise a hand held medallion transmitter having a "Help" switch and an "Off" switch, such as the remote activator 23 of FIG. 1 or it may comprise a smoke detector for informing the controller 50 that smoke has been detected. After detecting the signals from the remote activator 52, the radio receiver 54 demodulates the signals and supplies the demodulated data to the controller 50.

The remote activator 52 may also comprise a battery operated paddle switch comprised of a plate pivotally mounted on top of a switch box. Pressing down a side of the plate labeled "On" is equivalent to activating the "Help" switch on the hand held medallion and pressing down a side of the plate labeled "Off" is equivalent to activating the "Off" switch on the hand held medallion. The paddle switch is convenient for persons with disabilities who have trouble handling a telephone. Alternatively, the paddle switch may comprise one of the auxiliary devices 66.

To also help persons with disabilities, the remote activator 52 may comprise a sip/puff switch. The sip/puff switch comprises a pneumatic switch which gives a disabled person the ability to answer incoming calls and the ability to make an emergency call. The puffing into a blow tube is equivalent to depressing the "Help" switch on a hand held medallion and the sipping on the blow tube is equivalent to depressing the "Off" switch. The sip/puff switch will enable a disabled person to make an outgoing call or simply answer incoming calls without having to handle the telephone. As with the paddle switch, the sip/puff switch may comprise one of the auxiliary devices 66.

The remote activator 52 may also comprise a keypad transmitter. The keypad transmitter is a hand held device which comprises a plurality of buttons, including those normally found on the keypad of a telephone. The depression of a button on the keypad transmitter causes the keypad transmitter to generate RF signal identifying the depressed button to the central controller 50. Thus, with the keypad transmitter, someone can be remote from a telephone but still be able to dial numbers and otherwise control the telephone line as if they were using the keypad on the telephone. This keypad transmitter may further comprise an "Off" switch and a "Help" switch.

The front panel 58 has a "Help" switch and an "Off" switch. The home system is activated to call another party, such as the central station or a 911 exchange, by depressing the "Help" switch and is deactivated by depressing the "Off" switch. The "Help" switch and the "Off" switch are also used, as discussed more thoroughly below, to program the home system.

The front panel 58 also comprises a "POWER ON" indicator which is lit continuously when the system is AC powered and flashes every other second when the system is battery powered. An "AUTO ANSWER" indicator flashes intermittently during initial power up routine, continuously when an AUTO ANSWER mode has been selected, and continuously when an AUTO ANSWER ON AT THE END OF AN EMERGENCY CALL mode has been selected. A "LOW BATTERY" indicator is lit when a low battery condition has been detected.

The front panel 58 also comprises an "IN USE" indicator. The "IN USE" indicator flashes once each time the "Off" switch has been depressed, a signal from the remote activator 52 is received, a signal from one of the auxiliary devices is received, and each time a digit is dialed in a dialing mode. The "IN USE" indicator continuously flashes in a talking mode and continuously and rapidly flashes when one of the "Help" switches have been activated. The "IN USE" indicator intermittently flashes rapidly when the home system is placed in a programming mode.

Figures 1, 7A:
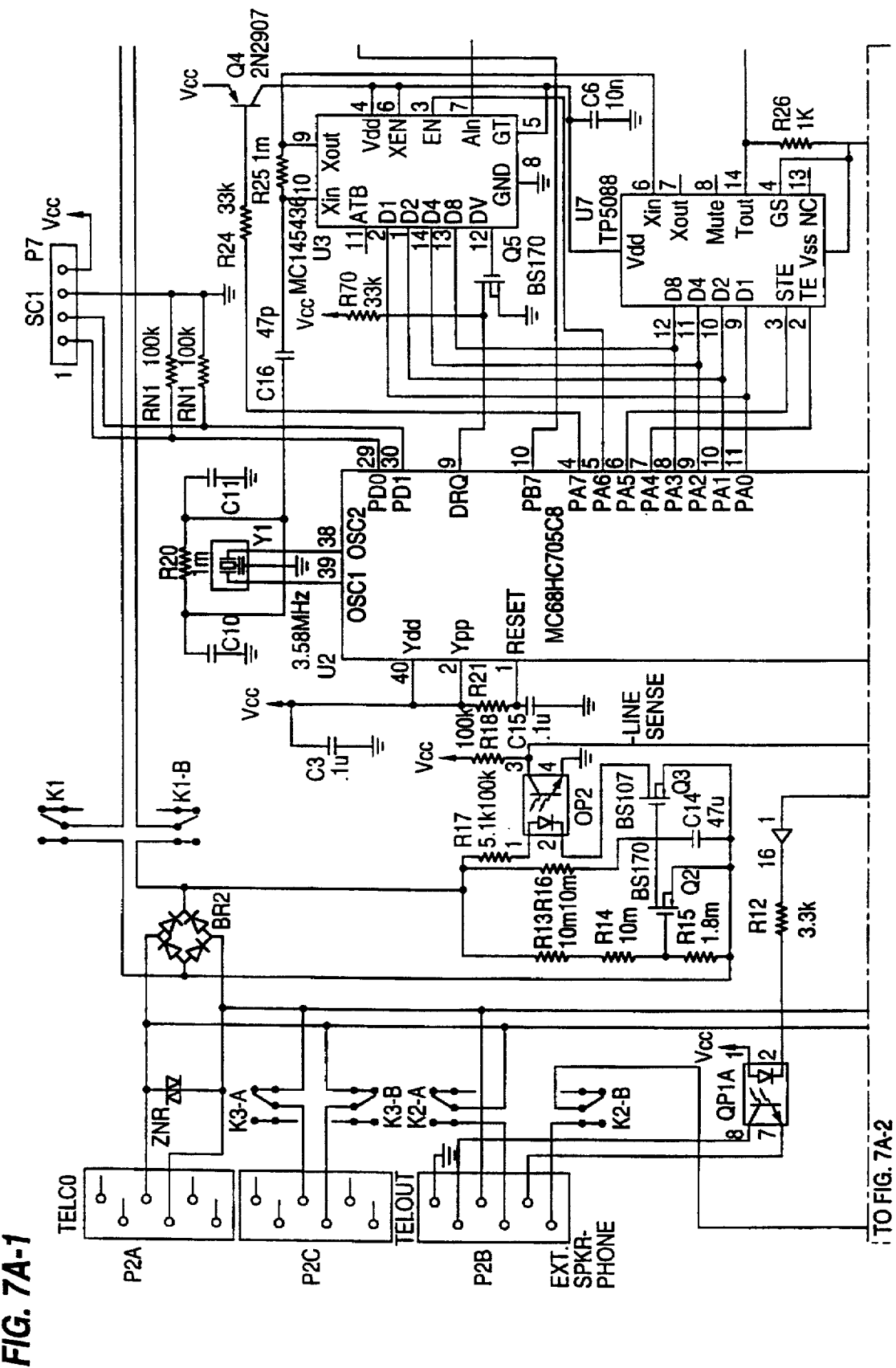
FIGS. 7A and 7B are interconnect circuit diagrams showing the circuitry in the home system of FIG. 6.
Figures 2, 7A:
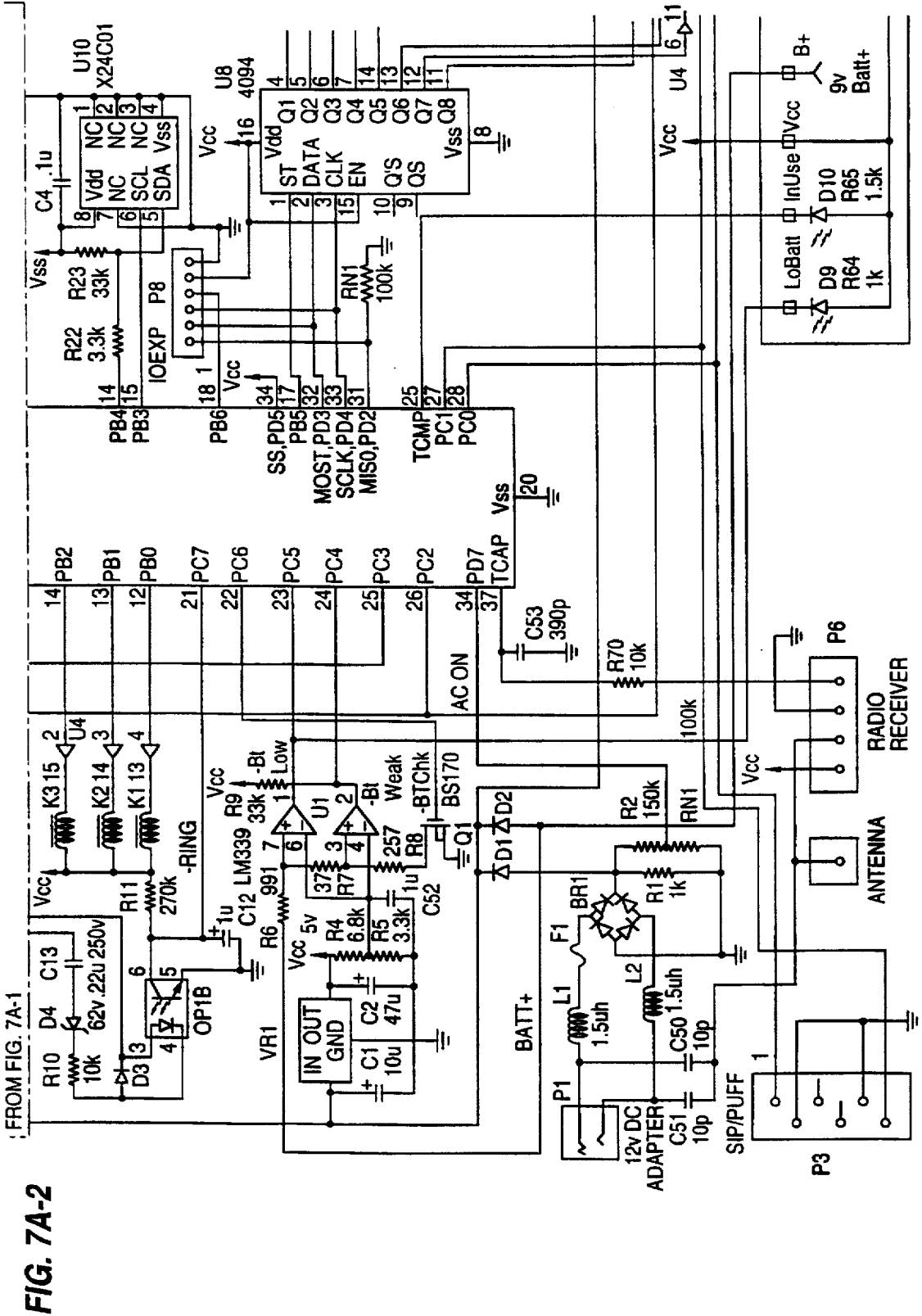
Figure 7B:
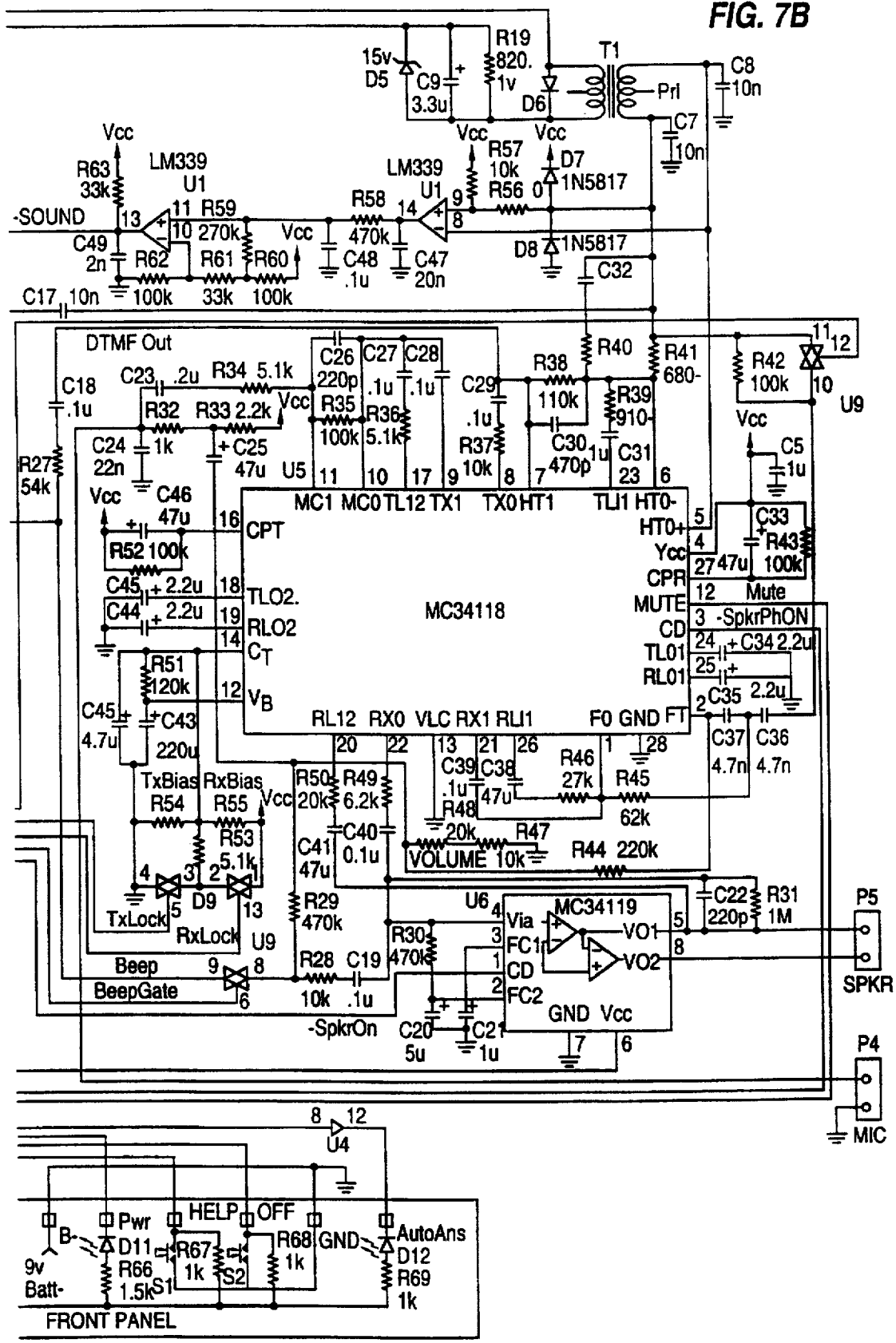

FIGS. 7A and 7B, when viewed together, illustrate the preferred circuit components in the home system of FIG. 6. As shown in the figures, the controller 50 preferably comprises an 8 bit, low power, microcontroller U2 having 8 k bytes of system ROM, 304 bytes of RAM, and power saving stop and wait modes.

The power supply 60 comprises a 12 VDC, 500 mA AC adapter plug P1 and a bridge BR1. The unregulated DC voltage is supplied to an audio amplifier U6, to an external speaker phone jack P2B via relay K2-B, and to a voltage regulator VR1 which supplies +5 VDC to any component requiring a 5 volt supply. The power supply 60 also comprises a back up 9 volt battery located in the front panel 58, which is labeled as U4 in FIG. 7B. A logic "1" at pin 36 of microcontroller U2 indicates that the home system is AC powered.

The battery level sense circuit 62 comprises a pair of comparators U1 which compare the battery level with reference voltages generated from the output of voltage regulator VR1. The battery level check is performed when microcontroller U2 drives the output pin 22 to a logic "1" thereby turning on transistor Q1 to establish the reference levels. When battery level is above the first threshold, which is preferably 8 volts, the comparators U1 generate logic "1"s at pins 23 and 24. As the battery level drops down to 8 volts, pin 24 is supplied with a logic "0" and when the battery level drops down to the second threshold level, which is preferably 7.5 volts, pin 23 is supplied with a logic "0."

The phone line sense circuit 68 comprises transistors Q2, Q3, optocoupler OP2, resistors R13, R14, R15, and R18. For high tip and ring (T/R) voltages, transistor Q2 is on while Q3 is off. As the T/R voltage drops, transistor Q2 turns off and transistor Q3 turns on to allow current to flow through optocoupler OP2. When current flows through the LED in optocoupler OP2, which occurs for line voltages between 3 and 20 volts, pin 25 on microcontroller U2 will drop down to a logic "0."

The ring detect circuitry 70 comprises an optocoupler OP1B to provide ring detection to pin 21 on microcontroller U2. When a ringing signal is being received, the signal applied on pin 21 will drop to a logic "0" during each half cycle of each ring thereby indicating the receipt of the ringing signal.

The phone line interface 72 comprises a transformer T1 and resistor R19 which are used to place a DC load on the telephone line and to therefore seize the line. Relay K2 is used to supply power to the external speakerphone jack P2B and relay K3 is used to disconnect the T/R signal to the TEL OUT jack when the unit is dialing. Pin 26 of microcontroller U2 drives optocoupler OP1A to provide muting of the external speakerphone.

The phone line signal detector 76 comprises a pair of voltage comparators U1 for detecting the presence of sounds on the line, for signal processing the signals on the line, and for providing an output to pin 19 of microcontroller U2. More specifically, a dial tone is detected if sound persists continuously for 2 seconds whereas in the absence of sound for 3 seconds, the microcontroller U2 determines that no dial tone exists. A 400 Hz tone is indicated to the microcontroller U2 when 3 seconds of continuous sound follows the answering of a call by a central station. A ring back signal is represented by 2 seconds of sound followed by 4 seconds of silence or by 1 second of sound followed by 3 seconds of silence. Also, a busy signal is represented by 0.5 seconds of sound and 0.5 seconds of silence repeated 3 consecutive times or by 0.2 seconds of sound and 0.5 seconds of silence repeated 3 consecutive times.

The DTMF generator 78 preferably comprises a dual tone multiple frequency (DTMF) generator U7 which produces tones according to the DTMF standard when binary-coded data is clocked into its input pins 9 to 12. The microcontroller U2 clocks the data into the DTMF generator U7 with signals supplied to input pin 2 and it causes the DTMF generator U7 to create single tone generation by signals supplied to input pin 3 of the DTMF generator U7. The DTMF generator U7 is coupled to a speakerphone chip U5 via a capacitor C18 and to the audio amplifier U6 through pins 8 and 9 of U9.

The DTMF receiver 74 preferably comprises a dual tone multiple frequency (DTMF) receiver U3 which has filters and decoders for detecting pairs of tones conforming to the DTMF standard. The DTMF receiver U3 is coupled to the telephone line via capacitor C17 and is supplied with power under the control of microcontroller U2. The DTMF receiver U3 provides the decoded output to the microcontroller U2 at output pins D1, D2, D4 and D8.

The nonvolatile memory 64 preferably comprises a 4096 bit serial electrically programmable/erasable read only memory (PROM) U10 which stores field reprogrammable data. The field reprogrammable data comprises system configuration and set up parameters, phone numbers, user ID, and residence codes. The data stored in nonvolatile memory 64 is read by the microcontroller U2 upon power up along with two security bytes indicating the revision level of the data. When the security bytes match the security bytes stored in the microcontroller U2, then the microcontroller U2 is assured that all parameters stored in the nonvolatile memory U10 are correct.

The speakerphone circuit 80 preferably comprises a speakerphone device U5 containing the necessary amplifiers, attenuators, level detectors, and control algorithm to form a high quality hands-free speakerphone system. The speakerphone device U5 is interfaced directly to tip and ring from pins 5 and 6 and through the coupling transformer T1. The speakerphone device U5 may be muted by the application of a signal on pin 12 from the microcontroller U2 and may be placed into a transmit only mode or a receive only mode by the application of a logic "1" or "0" respectively on pin 14. The volume control 86 is preferably a variable potentiometer R48 having its wiper connected to pin 13 of the speakerphone device U5.

The audio amplifier is preferably a low power audio amplifier U6 which receives signals from the speakerphone device U5 via pin 4. The audio amplifier U6 drives the speaker 84, which preferably comprises a speaker P5 connected to output pins 5 and 6. The audio amplifier U6 is disabled or enabled at pin 1 under the control of the microcontroller U2.

The front panel 58 preferably comprises a front panel U4 having a "POWER ON" indicator D11, an "AUTO ANSWER" indicator D12, and an "IN USE" indicator D10. The front panel U4 also comprises the "Help" switch S1, the "Off" switch S2, and a "LOW BATTERY" indicator D9.

The home system also comprises a plurality of jacks and controls. A POWER jack P1 couples AC power to the bridge BR1 and a TEL CO jack P2A provides a connection to the telephone company's line with a TEL OUT jack P2C. A speakerphone jack P2B enables the use of an external speakerphone and an auxiliary jack J3 enables the use of auxiliary devices.

Figure 8:
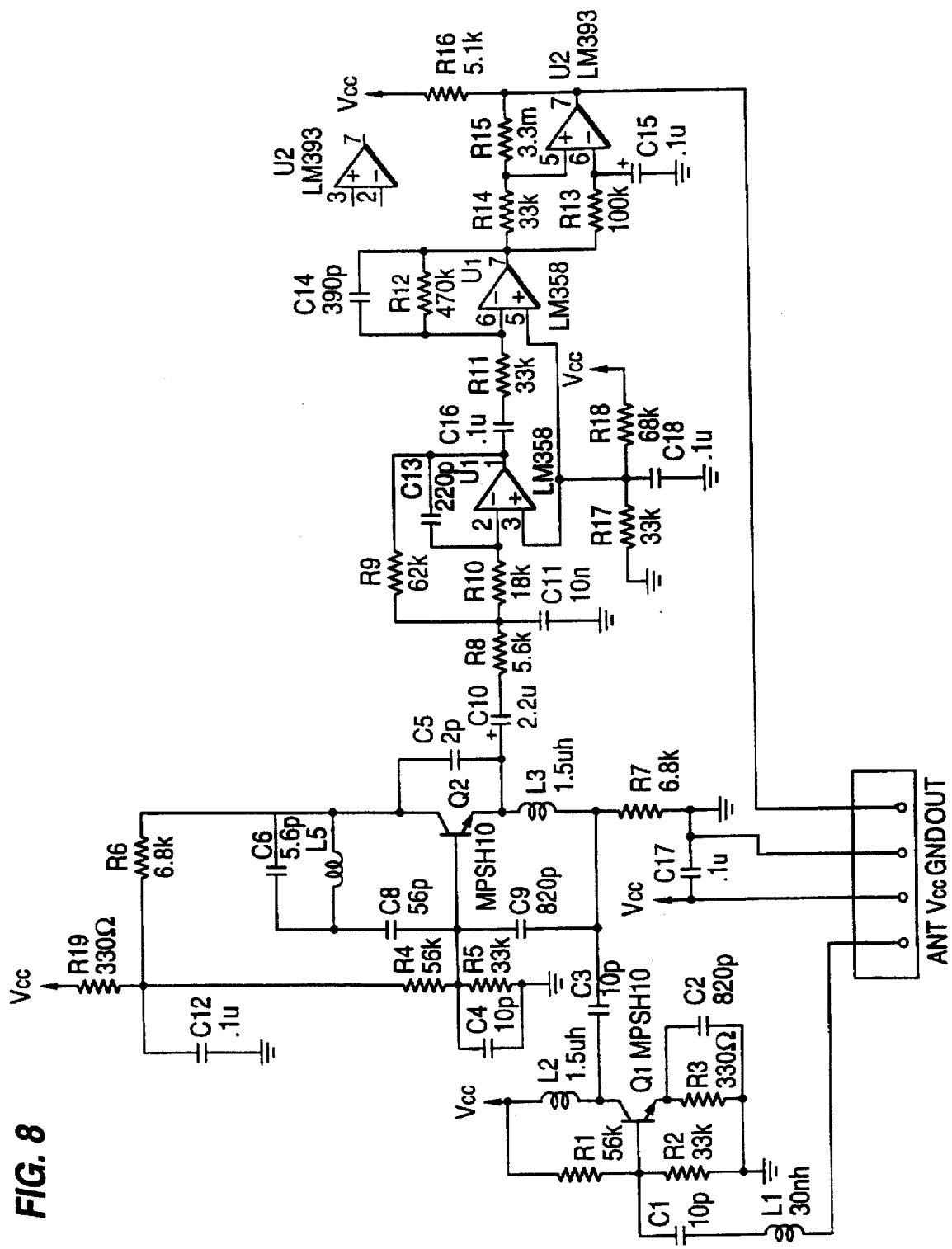
FIG. 8 is a circuit diagram showing an embodiment of a radio receiver.

FIG. 8 illustrates the preferred circuitry for use in the receiver 54. The receiver 54 preferably comprises a bandpass filter consisting of capacitor C1 and inductor L1 for filtering out the signals received from the antenna 56 and for also reducing any RF oscillations from reaching the antenna 56. The output of the bandpass filter is supplied to a preamplifier comprising transistor Q1. An inductor L2, capacitor C2, and resistor R5 tune the transistor Q1 so that it oscillates at the bandpass frequency.

Through a capacitor C9, the output of the preamplifier is input to an RF oscillator comprising a transistor Q2. The RF oscillator is tuned to a preferred operating frequency of 318.0 MHz with a variable inductor L5 and capacitors C5 and C6. A quench frequency of 500 kHz is supplied to the base of transistor Q2 by capacitor C9 and inductor L3. The amplified signal from the preamplifier modulates the quench signal so that the received signal becomes demodulated at the emitter of transistor Q2.

The output of the RF oscillator is supplied through a low pass filter comprising resistor R8 and capacitor C11 to operational amplifiers U1. At the first stage of the operational amplifiers U1, capacitor C13 filters out the quench frequency while resistor R9 sets the gain of the first stage relatively low to prevent data rate limitation. A two volt reference is provided at the non-inverting input of the first stage of the operational amplifiers U1 by resistors R17 and R18. The second stage of the operational amplifiers U1 has a high gain controlled by resistor R12 and is also supplied with a two volt reference value at its non-inverting input.

An output stage of the receiver 54 comprises a comparator U2 with adaptive threshold and hysteresis. The adaptive threshold is provided by resistors R13 and R14 and capacitor C15 while the hysteresis is provided by resistor R15 which is connected to give positive feedback. The output of the comparator U2 is supplied to the microcontroller 50 as input data.

Figure 9:
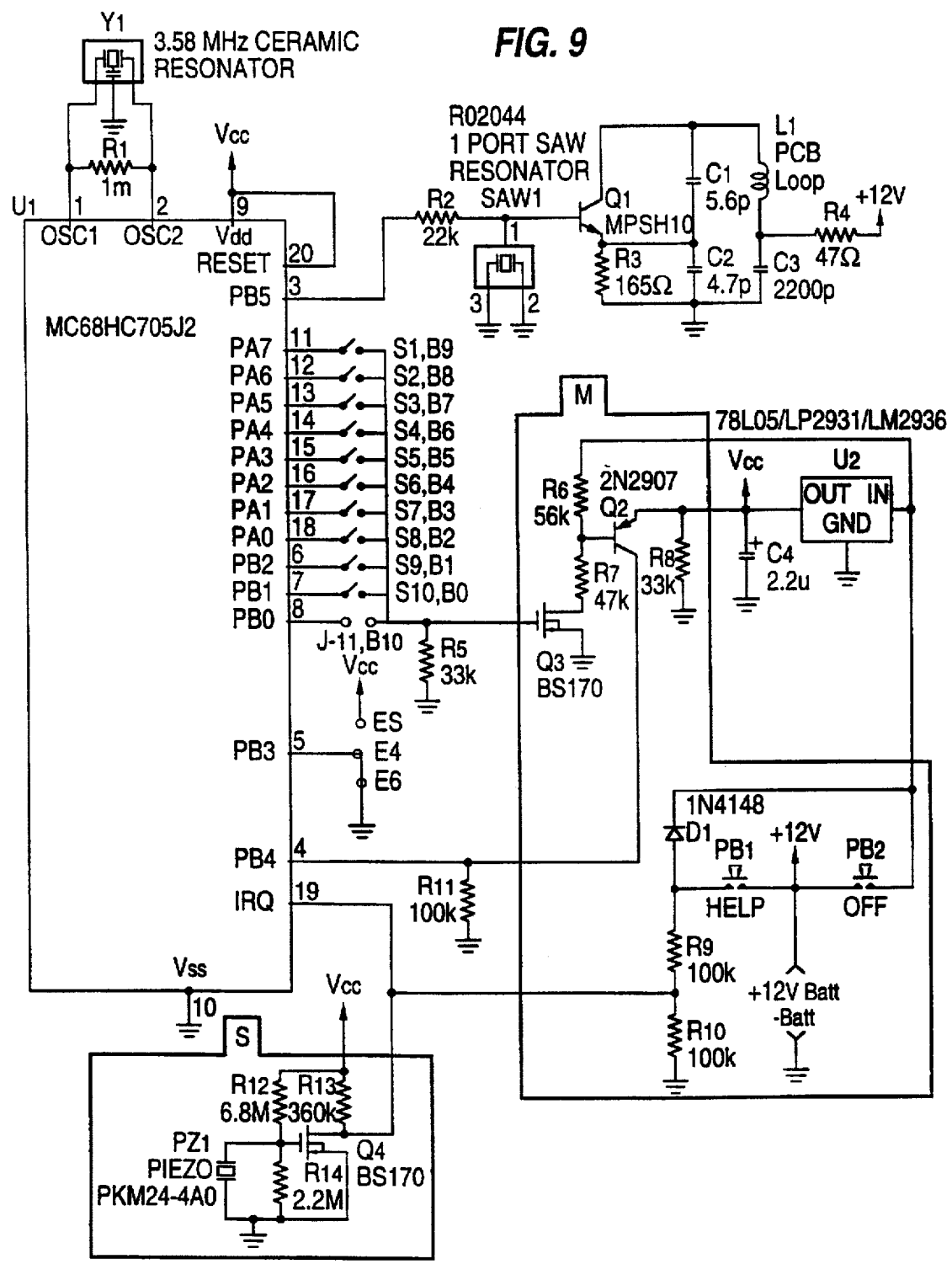
FIG. 9 is a circuit diagram showing an embodiment of a hand held unit and also showing an embodiment of a smoke detector.

FIG. 9 illustrates the circuit components used in a remote activator 52. The circuitry illustrated within a box "S" is used exclusively for the smoke detector. The remote activator 52, which may be a hand held medallion, a paddle switch, a sip/puff switch, or the smoke detector comprises a 12 volts DC battery which is usually disconnected from the other components of the circuit in order to conserve power. Through either the "Off" switch PB2 or the "Help" switch PB1, the battery is connected to a voltage regulator U2, which provides a +5 volts DC supply for a microcontroller U1.

Upon application of power by voltage regulator U2, the microcontroller U1 begins its initialization routine by driving each of the residence code switch ports S1 to S10 to a logic "1." The microcontroller U1 then reads each port to determine which are closed to a logic "0" through resistor R5 and which are floating at a logic "1."

Next, the microcontroller U1 turns on transistor Q3 through any one of the closed residence code switches S1 to S10 in order to check the battery level. A low battery is defined to have a voltage of 8.0 volts, plus or minus up to 5%. After transistor Q3 has been turned on, a logic "0" on pin 4 of the microcontroller defines a good battery while a logic "1" defines a low battery.

The microcontroller U1 then reads pin 19 to determine whether the "Help" switch PB1 or the "Off" switch PB2 was depressed. When switch PB1 is open, the 12 volts from the battery is blocked by diode D1 and pin 19 is pulled to logic "0" through resistor R10. If switch PB1 is closed, however, pin 19 is brought up to a logic "1" by the application of 12 volts from the battery to resistor R9. In this manner, the microcontroller U1 can differentiate between the depression of switches PB1 and PB2.

After reading in the residence code, checking the battery level, and then determining which switch was depressed, the microcontroller U1 outputs an appropriately formatted data stream from pin 3 to an UHF transmitter eight times within 800 ms. Frequency stability and a narrow bandwidth are provided by a surface acoustic wave (SAW) resonator SAW1. A high frequency oscillating transistor Q1 is modulated by the data with the basic frequency of the output determined by capacitors C1 and C2 and resistor R3, while the fine tuning of the frequency is performed by the SAW resonator SAW1. For transmitting the data to the antenna 56 associated with the radio receiver 54, a radiating antenna L1 is preferably constructed, for example, by etching copper foil on the base of a printed circuit board.

The circuitry involved with the smoke detector is also illustrated in FIG. 9. One difference with the smoke detector circuitry, however, is that rather than having a 12 volt battery, the circuitry runs off of the battery already used for smoke detection, which is typically a 9 volt battery. Additionally, the smoke detector circuitry will not have resistors R9, R10, diode D1, or switches PB1 and PB2. Therefore, the 9 volt battery will be directly connected to the voltage regulator U2 and to the voltage divider network of resistors R6 and R7 and will not have any connection to pin 19 other than that shown in the box labeled "S."

In order to conserve battery power, the microcontroller U1 is place into an idle or stop mode when no sounds have been detected by a piezoelectric element PZ1. Also to conserve power, a 3.58 MHz resonator Y1 connected to the microcontroller U1 will be powered to resonate only when the microcontroller is active and will not resonate when the microcontroller U1 is in the stop mode.

The piezoelectric element PZ1 generates electrical signals in response to received sound waves produced by the smoke detector. The piezoelectric element PZ1 is selective in that it generates electrical signals for only those sounds having the proper frequency and amplitude, which would include those sounds generated by the smoke detector. The electrical signals generated by the piezoelectric element PZ1 are supplied to the base of transistor Q4 and cause the transistor to repeatedly switch on and off. The switching of the transistor Q4 on and off, in turn, causes the voltage on pin 19 of microcontroller U1 to repeatedly go from logic "0" to logic "1," respectively.

When the microcontroller U1 is placed into an active mode by the switching on and off of pin 19, the microcontroller first determines the "signature" of the received signal. If the sound received has a frequency less than 250 Hz and has a duration less than 2 seconds, the microcontroller U1 determines that the smoke detector was activated due to a low battery condition. When the sound has a frequency greater than 250 Hz and lasts for more than 2 seconds but less than 15 seconds, the microcontroller U1 determines that a user has activated the smoke detector in order to test it. Finally, if the sound received has a frequency greater than 250 Hz and lasts for more than 15 seconds, the microcontroller U1 then determines that the smoke detector was activated in response to an emergency condition.

After determining the "signature" of the sound, the microcontroller U1 will then, as is done with the remote activator 52, drive all residence code switches to a logic "1," read the residence code switches, and perform a battery level check. The microcontroller U1 will next output a data string eight times within 800 ms at its output pin 3. This data string will be received at the antenna 56, radio receiver 54, and eventually the controller 50.

The radio receiver 54 and all transmitters employ a sophisticated data encoding and decoding scheme to reduce the influence of interfering radio signals or electrical noise emitted by other devices. These other devices often compromise the integrity of data being sent from a remote activator 52 to the receiver 54. Within the data format, inherent problems with variations in bit pulse widths have been overcome by using leading edge detecting in a pulse position modulation (PPM) scheme. Error detection is accomplished by encoding hamming code bits in each byte. The receiver 54 compares these hamming code bits with data contained in a look-up table to determine if an error is present in any byte.

The data format is preferably as follows: 1 PHHHAAA PHHHAAAA PHHHAAAA PHHHBVVV PHHHDDDD PHHHEEEE PHHHOOOO, where P is a parity bit, HHH is a hamming code, A is a 12 bit address, B is a battery status bit, V is a device code, D is data, E is "vertical" even parity bits for VVVV and for DDDD, and O is "vertical" odd parity bits for VVVV and DDDD. The entire block of data, as shown above, starts with a 1 and has a total of 57 bits per block. This block of data takes 100 ms to transmit and is repeated 8 times for a total transmission time of 800 ms.

The data is transmitted in a PPM data format with each bit cell divided into three equal time periods so that the duration of the bit cell is 3×572 µs, or 1716 µs. A logic "1" is sent by transmitting a pulse in the first time period, a logic "0" is sent by transmitting a pulse in the second period, and no pulses are generated in the third period of the bit cell. Bit number 7 of every byte is a single "horizontal" parity bit, which is based upon the 4 least significant bits of the byte, plus a 3-bit hamming code. The hamming code allows for the detection and correction of a single bit error for the 7 least significant bits in each byte. The hamming code can also detect the occurrence of more than a single bit error in the 7 bits.

Before the transmission of a block occurs, 16 "1"s are transmitted followed by a period of 2 bit times with no pulses. The 16-bit preamble of all "1"s allows the hardware in the receiver to stabilize prior to the transmission of any data. After this has occurred, the transmitter proceeds to generate the "1" start pulse and the subsequent 56 bits of the data block. Each of the eight data blocks generated is separated from the other data blocks by a period of 2 bit times having no pulses to give the receiver time to re-sync to the data stream.

The device codes (VVV) are as follows: B000 is reserved for the hand held medallion transmitter; B001 is reserved for the smoke detector; B010 is reserved for the sip/puff transmitter; B011 is reserved for the paddle transmitter; and B100 is reserved for the keypad dialer.

The command codes (DDDD) are as follows: 0000 Function "Off" or no-alarm and is intended for use with all devices; 0001 is for DTMF digit "1" and is intended for use with the keypad dialer; 0010 is for DTMF digit "2" and is intended for use with the keypad dialer; 0011 is for DTMF digit "3" and is intended for use with the keypad dialer; 0100 is for DTMF digit "4" and is intended for use with the keypad dialer; 0101 is for DTMF digit "5" and is intended for use with the keypad dialer; 0110 is for DTMF digit "6"

and is intended for use with the keypad dialer; 0111 is for DTMF digit "7" and is intended for use with the keypad dialer; 1000 is for DTMF digit "8" and is intended for use with the keypad dialer; 1001 is for DTMF digit "9" and is intended for use with the keypad dialer; 1010 is for DTMF digit "0" and is intended for use with the keypad dialer; 1011 is for DTMF digit "*" and is intended for use with the keypad dialer; 1100 is for DTMF digit "#" and is intended for use with the keypad dialer; 1101 is for the function of "OFF-HOOK" and is intended for use with the keypad dialer; 1110 is for the function of "REDIAL" and is intended for use with the keypad dialer; and 1111 is for the function of "On" or alarm and is intended for use with the keypad dialer.

The home system may be configured so that it communicates with a central station, a 911 exchange, or a third party upon receipt of an emergency signal. When the home system is configured to communicate with a central station and an emergency signal is received, the home system will place a call to the central station and provide the central station with an ID code identifying the caller. The home system will also automatically connect the speakerphone 84 to the central station's telephone to allow voice communication with emergency personnel.

Figure 12:
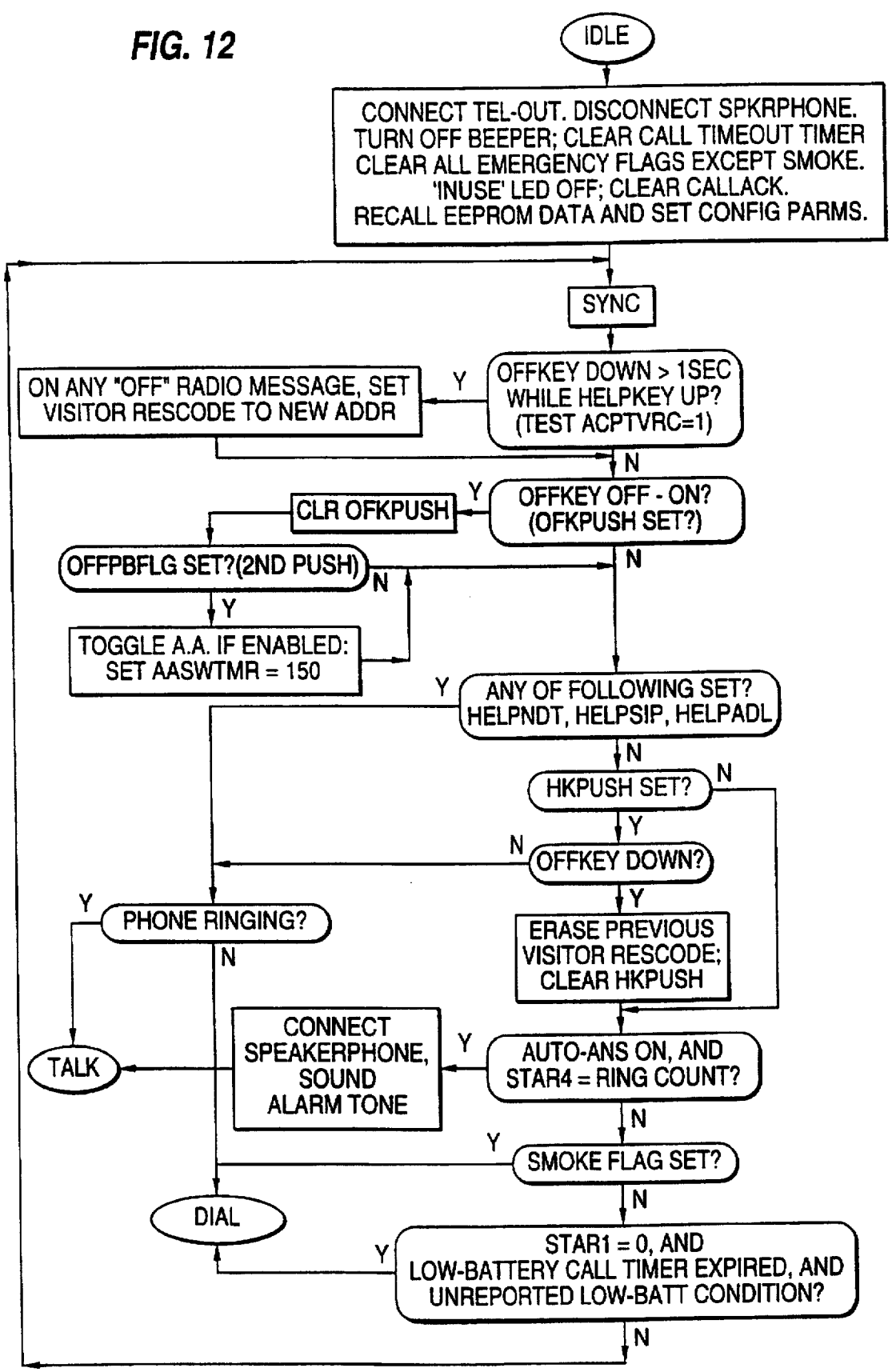
FIG. 12 is a flow chart illustrating the steps taken by the home system while the home system is idle.
Figure 13:
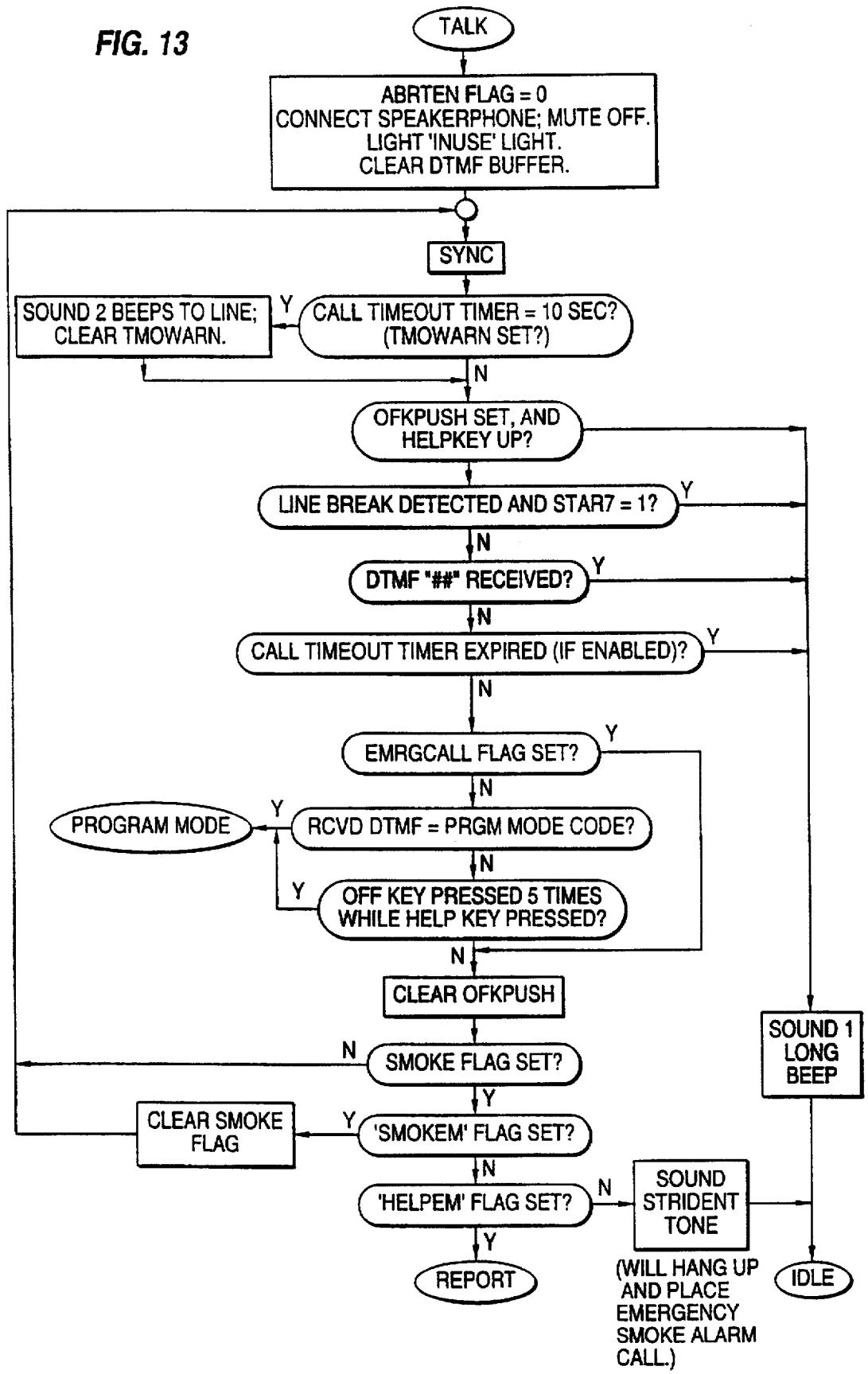
FIG. 13 is a flow chart illustrating the steps taken by the home system while the home system is on line.

FIG. 12 is a flow chart generally illustrating the steps taken by the home system while the home system is idle and FIG. 13 is a flow chart generally illustrating the steps taken by the home system while the home system is on line. In summary, while the telephone is idle, an emergency signal may be produced by depressing the "Help" switch on the hand held medallion, by depressing the "Help" switch on the front panel 58, by depressing the "On" switch on the paddle switch, by puffing on the sip/puff switch, or by pressing "On" with the keypad dialer. An emergency call may also be placed when the smoke detector detects smoke regardless of whether the phone is idle or off hook.

The home system will also automatically provide calls to the central station upon detection of a low battery at the home system, at a remote activator 52, or at one of the auxiliary devices 66. A low battery call to the central station will cause an indication at the station, such as the lighting of a yellow "NON-EMERGENCY" light, but does not provide for voice communication. In other words, as soon as the low battery condition has been reported, the call is terminated. Also, an emergency call will take priority over a call only reporting a low battery condition.

If the home system is configured to communicate with a 911 exchange or a third party, then after receipt of an emergency signal the home system places a call at the programmed number or numbers. Once the call has been placed to the programmed number, the telephone line is connected to the caller's speakerphone to allow voice communication with the called party. A low battery reporting call will not be placed to the 911 exchange or to a third party.

Figure 10:
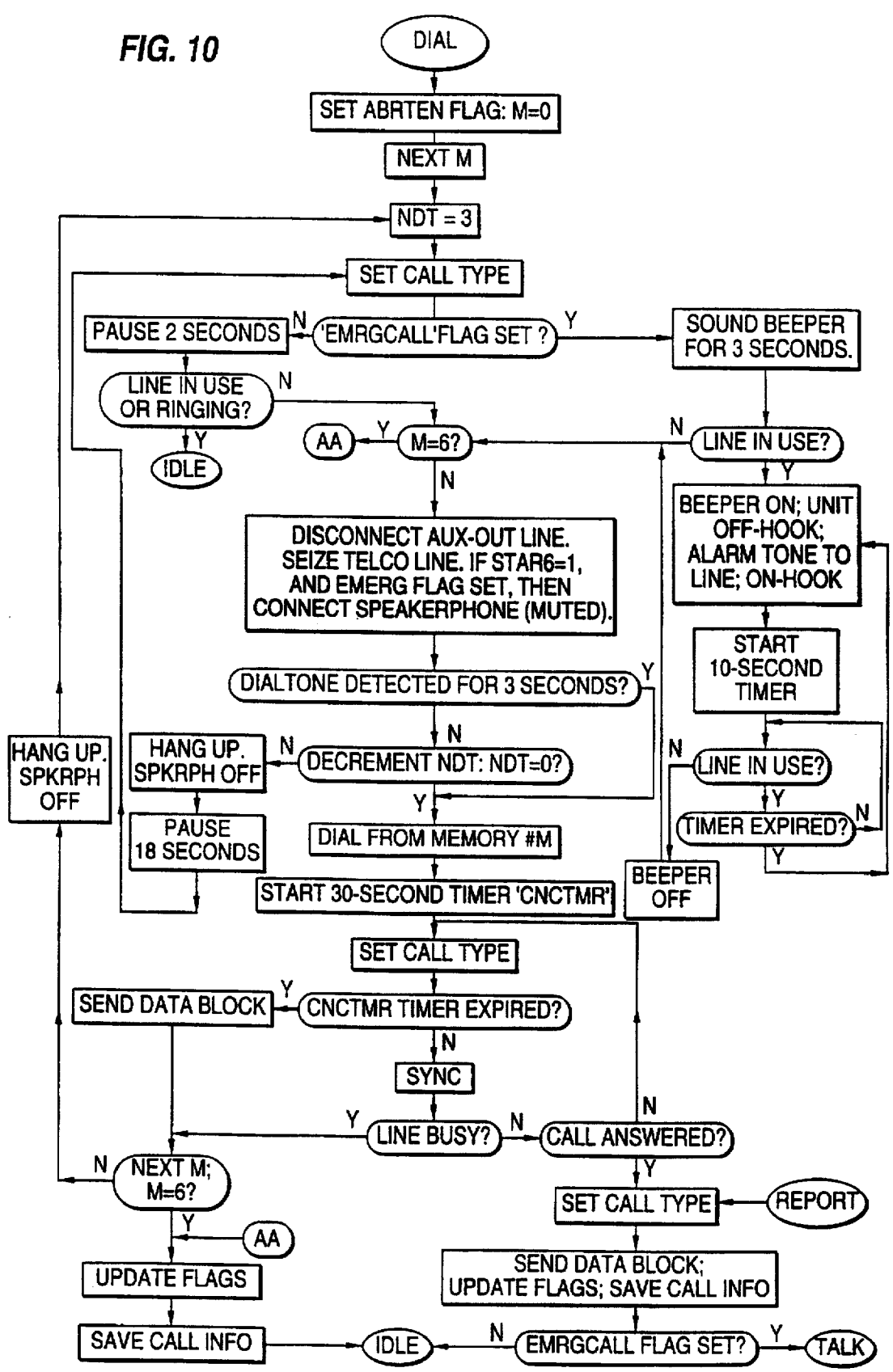
FIG. 10 is a flow chart illustrating the steps taken by the home system after the activation of a "Help" switch.

FIG. 10 is a flow chart illustrating the operations of the home system after an emergency call has been received. In summary, when an emergency signal is received, whether it be from the front panel 58, the remote activator 52, or an auxiliary device 66, the home system will beep for approximately 3 seconds to indicate to the caller that the emergency signal is being acted upon and to provide an opportunity for the caller to cancel the call in case the system was accidentally activated. If a telephone line is in use when the emergency signal is received and the line is not under the control of the home system, the system will sound a tone on the line to indicate to the people on the line that an emergency signal has been received and that an emergency call needs to be placed.

Next, the home system will disconnect the speakerphone, as well as any other phone which may be connected to the home system, seize the line, and then listen for a dial tone. Depending upon the programming of the system, the speakerphone may be off or it may be on with its microphone muted until after a call has been placed. If a dial tone is not detected after the line has been seized, the system will hang up for approximately 20 seconds and retry from the beginning by sounding a beep for 3 seconds.

When a dial tone is detected or after three attempts, the home system will proceed to dial the first telephone number stored in memory. Typically, the first number will be the central station. If the line is busy, if it rings eight times, or if 30 seconds passes without an answer, the home system will hang up and repeat from the beginning by sounding a beep for 3 seconds. This time, however, the home system will dial the second telephone number programmed. This process repeats itself until all of the numbers in memory have been exhausted, until a call is answered, or until the call has been canceled by the caller, for instance by depressing the "Off" switch.

If the central station answers the call, either a 4 second 400 Hz tone or any one of the DTMF digits will be sent from the central station to the home system to acknowledge that a connection has been made. When the home system is configured to communicate first with a 911 exchange or with a third party, acknowledgement is inferred from the receipt of the answered call by, for example, a non-ringing sound on the line or approximately five seconds of silence.

After being acknowledged by the central station, the home system will transmit a 7-digit block of information for display at the central station. In these 7 digits, the first four digits are the caller's ID number, the fifth digit is the number of the device which initiated the call, the sixth digit is the battery status of that device, and the last digit turns on or off the yellow NON-EMERGENCY light.

In the event that the call has been answered by the central station but the central station has not sent an acknowledgement, the home system will transmit the 7-digit block of information to the central station and then hang up. The home system will then repeat the process from the beginning by sounding a tone for 3 seconds and will attempt to call the next number stored in memory. After the call has been received and acknowledged, the home system will switch on the speakerphone 84 to allow immediate voice communication with the 911 operator or with the third party. When the home system is configured to first call the central station, the speakerphone will be switched on after the home system has sent the 7-digit block of information to the central station.

The home system will sound a tone to terminate a call, whether the speakerphone is connected or the home system has the phone off-hook, when one of several conditions has occurred. For instance, as shown in FIG. 13, the home system will sound one long beep to terminate a call when any one of the "Off" switches has been depressed, when a line break has been detected, or upon expiration of a call timeout period if such a timer is enabled by programming. Also, the home system will sound one long beep to terminate a call if two consecutive "#" keys have been pressed on any phone connected to the line, upon the expiration of a program mode timeout timer, or when an emergency signal has been received from a smoke detector.

As also shown in FIG. 13, an emergency signal from a smoke detector will cause the home system to sound a strident tone to the parties on the line to prompt them to terminate the call. Once the call has been terminated, the home system will attempt to call the central station. However, if the current connection is with the central station and an emergency signal is received from a smoke detector, the home system will not prompt the parties on the line to terminate the call. Instead, the home system will update the 7-digit block of information and only temporarily disconnect the speakerphone from the call while the updated 7-digit block of information is transmitted to the central station.

The home system may be programmed to suit the needs and desires of a particular user. When placed in the programming mode, the "IN USE" indicator on the front panel 58 is alternately lit bright and then dim. Programming enables the home system to store up to six telephone numbers, to store the user's four digit ID number, and to communicate with the central station, with a 911 exchange, or with other third parties. Various other features may also be programmed into the home system.

For instance, the home system may be programmed to have a call timeout delay which will cause the home system to automatically hang up after a programmed time period. When the home system is configured to automatically terminate a call, the home system will sound two short warning beeps ten seconds prior to disconnection so that the timer may be reset, for example, by depressing any touchtone key from any phone on the line or by pressing the "Help" switch on a remote activator 52.

The home system may also be programmed so that incoming calls are automatically answered and to set the number of rings before a call is answered. The home system can be toggled between auto-answer and no auto-answer in an additional way besides programming the home system. By pressing an "Off" switch twice from any transmitter, the home system can be switched into an auto-answer mode or out of an auto-answer mode. When the home system is in an auto-answer mode, the "AUTO-ANSWER ON" light on the front panel 58 is activated. Additionally, the auto-answer mode may be toggled by consecutively pressing the "*" keys twice within three seconds with any phone connected to the home system. The home system will sound two short beeps when auto-answer has been activated and will sound three short beeps when auto-answer has been deactivated.

An additional feature that may be programmed into the home system includes a temporary "TEACH" mode during which the home system can be taught the owner's residence code. After the home system is placed into the "TEACH" mode, an "Off" button is pressed on the home system followed by the depression of an "Off" button on a hand held medallion, sip/puff transmitter, or paddle. The home system then receives the residence code from the transmitted signal and stores the residence code as the owner's residence code.

Also, the home system may be programmed to accept visitor residence codes. When two or more people use the same home system, the home system may be programmed so that it also responds to the visitor's residence code. To program a visitor's residence code into the home system, the home system is placed in the "TEACH" mode and while the "Off" switch is depressed on the home system, the "Off" switch on the visitor's transmitter is depressed to cause a transmission of the visitor's residence code to the radio receiver 54. The central controller 50 then stores the visitor's residence code thereby allowing the visitor's residence code to activate the system. Only after the visitor's "Off" switch has been depressed may the "Off" switch on the home system be released. By programming a visitor's residence code into the home system, a visitor's hand held medallion, sip/puff transmitter, or paddle switch can activate the home system. The home system, however, will preferably not respond to signals sent from the visitor's smoke detector.

The home system can store up to four separate visitor codes. Any visitor codes entered after the four that have been already entered will simply replace the oldest visitor's residence code, unless the new entry is a duplicate of an existing visitor's residence code in which case the new entry will not be entered. The most recent visitor code may be erased by pressing and holding down the home unit's "Off" switch while pressing the "Help" switch and subsequent visitor codes may be erased by repeatedly pressing down the "Help" switch while the "Off" switch is depressed.

Further features that may be programmed include whether to have a line break terminate a current connection, whether the speakerphone is muted during an emergency call prior to an acknowledgement from the central station, and whether the internal speakerphone can be placed in a high gain transmit or receive mode. If the speakerphone control is enabled, then whenever any party to a call presses a "*1," the speakerphone is momentarily placed in a transmit only mode for, for example, five seconds so that a party to the call can listen with greater sensitivity. By pressing a "*2" from any phone on the line, the speakerphone is momentarily placed in a receive only mode wherein the caller at the home system may be heard with greater volume. By pressing "*3" or by pressing any "Off" switch, the speakerphone returns to its normal use. The home system sounds a single beep when placed into the transmit only mode, two beeps when placed in the receive only mode, and three beeps when returned to normal speakerphone operation.

In order to program the home system, the home system must be able to receive tones from the telephone's keypad. In order to not receive warning tones from the phone company and to not place a call based upon the programmed tones, it is preferable to have the home system already connected to another party. Once a call has been made, any telephone on the line may cause the home system to enter the program mode by pressing the key sequence "#*#*." In response to these tones, the home system will sound three short beeps, the "IN USE" light will flash rapidly, and the speakerphone will be disconnected from the line. While in the programming mode, the home system will not respond to emergency signals except if placed in the "TEACH" mode.

The telephone numbers in memory may be programmed by depressing a keypad sequence of "#X N ... N*#", where X is a number from 1 to 6 and is entered in accordance with which one of the six telephone numbers is being stored and the sequence "N ... N" represents the actual telephone number and may be up to 32 digits in length. Thus, the first number is programmed by depressing the sequence "#1 N . . . N*#." Also, a "#" in the sequence results in a 2-second dialing delay and should precede the entering of any third party number.

The home system may be programmed to accept the user's ID number and to configure the home system as the user desires. The user ID may be programmed by depressing "#0 NNNN *#" where NNNN is the four digit ID number of the user. The entry of codes "*0N" to "*8N" generally relate to the configuration and set up of the home system. These codes determine if the home system will use touchtone dialing or pulse dialing, whether the speakerphone is enabled, the timeout period before automatic termination of a call, if auto-answer is enabled, the number of rings before an incoming call is automatically answered, whether visitor residence codes are allowed, whether the speakerphone is on-hook at the start of an emergency call, whether detection of a line break will terminate a call, and whether the home system can be placed in the "TEACH" mode.

After each entry has been completed, for instance after each phone number has been programmed and after each configuration entry has been entered, the home system will sound three short beeps to the phone line. If an error has been detected in the entry of the code, the home system will sound three pairs of alternating high/low pitched beeps to indicate to the programmer that the home system has ignored the last entry.

The programmer can exit the program mode by depressing two consecutive "#" keys. The home system will sound four short beeps indicating to the programmer that the home system is no longer in the program mode. The home system will also exit the program mode when no touchtone key has been depressed for a certain amount of time, for instance 60 seconds. Prior to terminating the call, however, the home system will warn the programmer with a single long beep that the home system is about to exit the program mode and terminate the call.

Any time the home system has its phone off-hook or has the speakerphone in operation, the home system can be instructed to transmit information to a party on the line. This option is desirable since the home system can transmit information to maintenance personnel who can verify whether the home system has been configured and set-up properly.

The information transmitted to another party on the line includes the phone numbers stored in memory, the user's ID number, and the programming of the configuration and set-up features. The configuration and set-up information includes such information as the dialing method, whether high gain speakerphone control is enabled, the auto time out, whether auto answer is enabled, and the number of rings before an incoming call is automatically answered. Also, the configuration parameters comprise whether visitor codes are enabled, whether line break is enabled, whether the speakerphone is off hook at the start of call, the version of software used by the home system, and the versions of the EEPROMs.

Additionally, the home system can transmit information related to the last call. This information comprises such information as the ID code, the device which initiated the call, the battery status, whether it was an emergency call, whether the call was acknowledged, the position in memory of the called number, the elapsed time since the call was made, and the elapsed time on the power. Further, the home system can be instructed to transmit the residence code in both decimal and in binary format.

Figure 14:
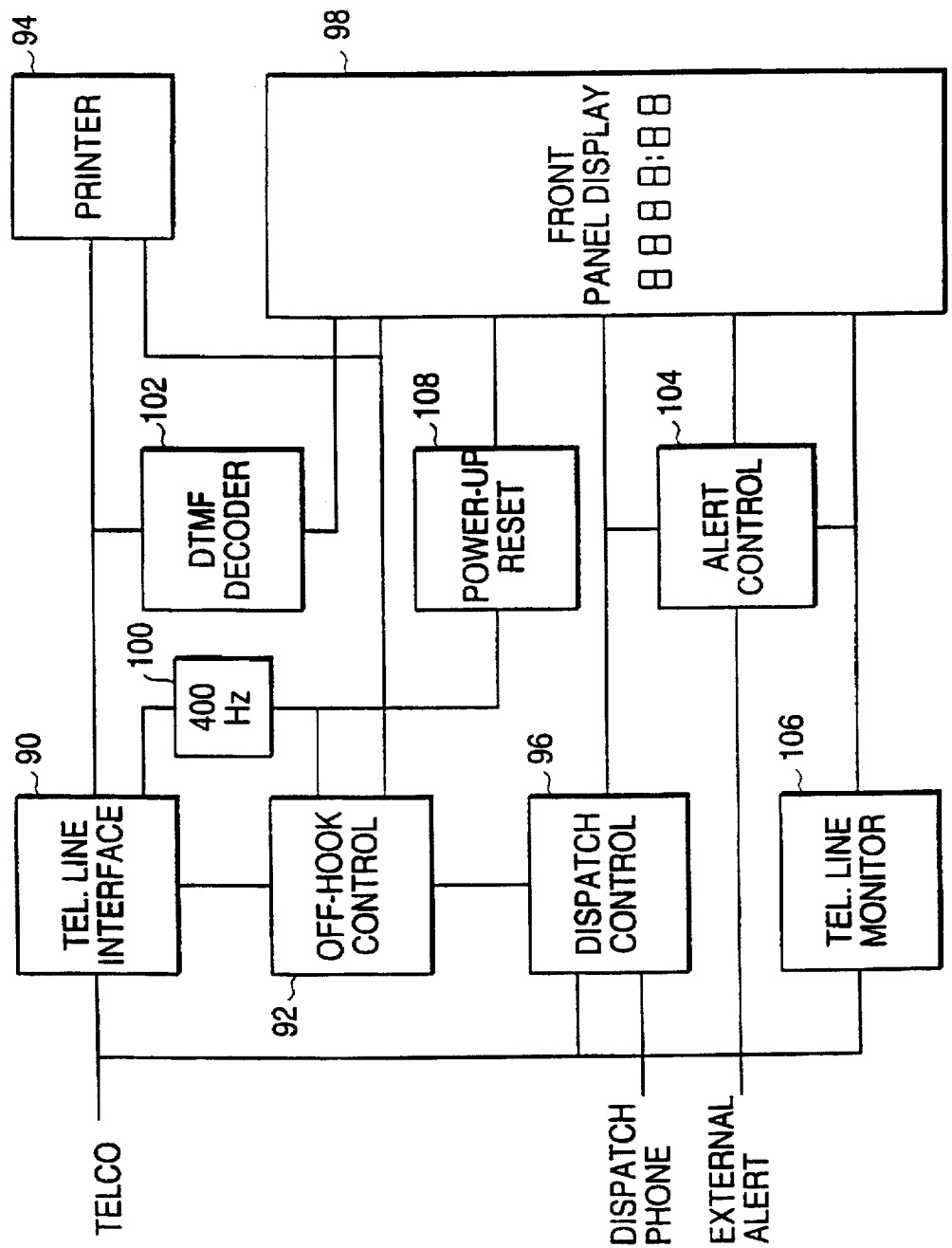
FIG. 14 is a block diagram of an embodiment of the central station for receiving calls from the home system.

A block embodiment of the central station is illustrated in FIG. 14. As shown in the figure, the central station comprises a telephone line interface module 90 which sends a ringing signal to an off-hook control module 92 upon detection of an incoming call. After completion of the first ring, the off-hook control module 92 instructs the telephone line interface module 90 to answer the call. At this time, the off-hook control module 92 also transmits an off-hook signal to a printer 94, a dispatch control module 96, and a front panel display module 98.

Next, after approximately three seconds, the telephone line interface module sends a signal to a 400 Hz generator 100 which feeds a nominal four second tone burst back to the telephone line interface module 90. The telephone line interface module 90 then sends this four second tone burst onto the telephone line as an acknowledgement signal.

All incoming telephone signals on the telephone line are passed through the telephone line interface module 90 and are routed to the printer 94 and to a DTMF decoder module 102. If the incoming call was initiated by a home system, such as the HASTEN 500, the central station will receive a DTMF encoded message. The DTMF encoded messages are decoded and printed by the printer 94 as long as the printer is held in an off-hook state by the off-hook control module 92. The DTMF decoder module 102 converts all of the DTMF pulses into their binary form and produces a clock pulse representing valid DTMF digits. The information produced by the DTMF decoder module 102 is provided to the front panel display module 98.

The front panel display module 98 preferably comprises a six-digit display, an "ALERT" indicator, an "OFF-HOOK" indicator, and a "NON-EMERGENCY" indicator. Preferably, the "ALERT" indicator, the "OFF-HOOK" indicator and the "NON-EMERGENCY" indicator are all indicator lights. With the six-digit display, each distinct DTMF digit decoded by the DTMF decoder module 102 clocks the display counter so that successive digits fill the display. In other words, the first received DTMF signal is displayed in the first position, the second signal is displayed in the second position, and etc. The front panel display module 98 only displays the DTMF digits 0 to 9 and is reset by DTMF digits, *, #, A, B, C, and D.

For example, a typical message transmitted in the DTMF format by the home system might be represented as "#1010030#1010030#1010030*." The printer 94 would receive this data and print out this message in its entirety. The front panel display 98, on the other hand, will display each set of digits by scrolling through the sets. Typically, three sets of seven displayable digits are sent so the front panel display 98 would scroll through the three sets of digits. The resultant message which would be displayed would be "1010:03," with the colon always being displayed between the fourth and fifth digits.

The signals from the off-hook control module 92 function to erase the display at the beginning of every call and signals from the dispatch control module 96 allow the front panel display module 98 to "lock" the display to prevent further updates from being displayed once the telephone is taken off-hook. The signals from the off-hook control module 92 also light the "OFF-HOOK" indicator to thereby indicate that the central station has answered an incoming call.

When the dispatch control module 96 receives a signal from the off-hook control module 92 due to the central station answering an incoming call, a nominal fifteen second delay timer within the dispatch control module 96 is triggered to start timing. At the expiration of this time period, the dispatch control module 96 sends a signal to an alert control module 104. The alert control module 104 activates a chime and through the front panel display module 98 flashes the "ALERT" light. The alert module 104 then closes a relay contact connecting a rear panel dispatch jack to the telephone line in order to permit dispatch telephone access to the line. Every incoming call which is answered by the central station triggers this delay timer. An incoming message from a home system, such as the HASTEN 500 home unit, should be completed before expiration of the timer thereby blocking any possible interference with the dispatch telephone. The dispatch control module detects the dispatch telephone going off-hook by sensing current flow in the dispatch telephone and sends a signal to the alert module 104 and the front panel display module 98. A signal is then sent to the off-hook control module 92 in response to the dispatch telephone going on-hook.

In response to signals from the dispatch control module 96 or from a telephone line monitor module 106, the alert control module 104 activates the chime and sends a signal to the front panel display module 98, which causes the "ALERT" light to flash. Once the alert control module 104 is activated, the alert control module 104 will remain active until it is reset by an ALERT RESET switch or by a dispatch telephone off-hook signal from the dispatch control module 96. A normally open relay contact directly follows the action of the chime and is connected to an EXTERNAL ALERT jack preferably located at the rear panel of the unit.

The telephone line monitor module 106 continuously senses the telephone line in order to detect service interruption. If the service is interrupted for more than a certain amount of time, for instance approximately one minute, the telephone line monitor module 106 transmits a signal to the alert control module 104 and to the front panel display module 98. This signal activates the chime and causes the "OFF-HOOK" light and the "ALERT" light to rapidly flash. When the telephone line is restored for more than a certain amount of time, preferably, for example, fifteen seconds, the telephone line monitor module 106 is reset and is caused to retransmit the signal to the alert control module 104 to thereby activate the chime and cause the "ALERT" light to slowly flash.

A power-up reset module 108 provides a reset pulse whenever the central station has power restored. This pulse is directed to the off-hook control module 92, the 400 Hz generator 100, and the front panel display module 98. The restoration of power to the other modules in the central station automatically places them in a proper reset state.

The off-hook control module 92 transmits a signal to the front panel display module 98 to turn on the "OFF-HOOK" light whenever the central station answers an incoming call. A signal from the alert control module 104 causes the "ALERT" light to slowly flash in response to signals from the dispatch control module 96. If the telephone service is interrupted, a signal from the telephone line monitor module 106 overrides both the signal from the off-hook control module 92 and the signal from the alert control module 104 and causes both the "OFF-HOOK" light and the "ALERT" light to rapidly flash.

The "NON-EMERGENCY" light in the front panel display module 98 is controlled by signals from the off-hook control module 92, the DTMF decoder module 102, and the power-up reset module 108. The "NON-EMERGENCY" light is turned off if and only if the seventh displayable digit in a message from a home system is a "1." The "NON-EMERGENCY" light is also turned off at power-up by signals from the power-up reset module 108 and is turned off at the start of every call by signals from the off-hook control module 92.

The printer 94 is used to record the date and time of all calls to the central station, to provide a record of all DTMF information exchanged during calls, and to time the duration of the calls. The printer 94 receives power from the central station and is controlled via the telephone line interface module 90 and the off-hook control module 92. When the central station goes off-hook in response to an incoming call, the printer begins monitoring the DTMF signals obtained through the telephone line interface module 90 and starts an off-hook timer. All valid DTMF signals which are placed on the telephone line during the off-hook state of the central station are printed out at the printer 94. The transition of the central station to the on-hook state stops the off-hook timer and causes the printer 94 to print out the duration of the call.

It will clearly be understood by those skilled in the art that the foregoing description has been made in terms of the preferred embodiments and various changes and modifications may be made without departing from the scope of the present invention which is to be defined by the appended claims.

We claim:

1. A programmable emergency communication system for communicating between a home system and another party, comprising:

an automatic dialer programmed to dial at least one telephone number upon command;

means for transmitting a first control signal in response to an external condition;

a speakerphone coupled with a telephone line for enabling hands free reception and transmission of voice-to-voice communications when interconnected with said telephone line; and a reprogrammable central controller, connected to said speakerphone and to said automatic dialer, for controlling the operations of said home system in accordance with a selected set of reprogrammable options;

wherein said central controller, upon receipt of said first control signal, connects said automatic dialer to a telephone line and generates said command to cause said automatic dialer to dial said at least one telephone number, and wherein said central controller, upon receipt of an interrogation from a central station, transmits information indicating said selected set of reprogrammable options to said central station.

2. An emergency communication system as set forth in claim 1, further comprising means for supplying working power to said system and wherein said power supplying means has a back up battery to supply power to said system in case of a power failure.

3. An emergency communication system as set forth in claim 2, wherein said central controller periodically compares a power level of said battery with at least one reference level and informs a central station if said power level falls below said at least one reference level.

4. An emergency communication system as set forth in claim 3, wherein said central controller additionally compares said power level with a second reference level and if said battery falls below said one reference level, then said central controller informs said central station that said battery is weak and if said battery falls below said second reference level, then said central controller informs said central station that said battery needs replacing.

5. An emergency communication system as set forth in claim 1, wherein said transmitting means comprises a hand held medallion having an emergency switch and said external condition comprises the depression of said emergency switch.

6. An emergency communication system as set forth in claim 5, wherein said selected set of reprogrammable options comprises an option of having said central controller receive a plurality of first control signals from a respective plurality of hand held medallions with each hand held medallion transmitting a unique identifying code.

7. An emergency communication system as set forth in claim 1, wherein when an incoming call is being received over said telephone line and said central controller receives a second control signal from said transmitting means, said central controller automatically answers said incoming call and activates said speakerphone.

8. An emergency communication system as set forth in claim 1, further comprising a plurality of audio and visual indicators to aid a programmer in programming said selected set of reprogrammable options, to indicate when an emergency signal has been received by said central controller, to indicate when a battery level is below a reference level, and to indicate whether said central controller will automatically answer incoming calls.

9. An emergency communication system as set forth in claim 8, wherein if sound is detected by said central controller within five seconds but no acknowledgement has been detected, said central controller hangs up and causes said automatic dialer to dial a second telephone number.

10. An emergency communication system as set forth in claim 1, wherein said transmitting means periodically compares a level of a battery supplying power to said transmitting means with a reference level and transmits a second control signal to said central controller if said battery falls below said reference level.

11. An emergency communication system as set forth in claim 10, wherein said central controller, upon receipt of said second control signal, connects said automatic dialer to a telephone line, generates said command to cause said automatic dialer to dial said at least one telephone number, and then transmits said second control signal to a central station.

12. An emergency communication system as set forth in claim 1, wherein when said first control signal is an emergency signal, said central controller will seize said telephone line upon detection of a dial tone, cause said automatic dialer to dial one of a possible multiple telephone numbers, and then listen for an acknowledgement from a central station.

13. An emergency communication system as set forth in claim 1, wherein an option of said selected set of reprogrammable options is having incoming calls automatically answered after a variable number of rings.

14. An emergency communication system as set forth in claim 1, wherein an option of said selected set of reprogrammable options is to automatically terminate a call after a variable period of time.

15. An emergency communication system as set forth in claim 1, wherein an option of said selected set of reprogrammable options is to have said central controller detect a break in said telephone line.

16. An emergency communication system as set forth in claim 1, wherein an option of said selected set of reprogrammable options is to have said speakerphone placed in a transmit only mode, where sounds originating near said speakerphone are transmitted at a high gain over said telephone line, or in a receive only mode where said speakerphone amplifies sounds received over said telephone line at a high gain.

17. An emergency communication system as set forth in claim 1, wherein said selected set of reprogrammable options comprises an option of programming a plurality of telephone numbers to be dialed by said automatic dialer.

18. An emergency communication system as set forth in claim 1, wherein when a telephone connected to said central controller has accessed said telephone line and said first control signal is received by said central controller, said central controller sounds a warning tone on said telephone line indicating that said central controller needs to gain control of said telephone line.

19. An emergency communication system as set forth in claim 1, wherein, when said central controller is placed in a TEACH mode, said central controller receives an identifying code of said transmitting means and stores said identifying code which thereby enables said transmitting means to activate said home system to automatically dial said one telephone number.

20. A programmable emergency communication system, for communicating between a home system and another party, comprising:

an automatic dialer programmed to dial at least one telephone number upon command;

means for transmitting a first control signal in response to an external condition;

a speakerphone coupled with a telephone line for enabling hands free reception and transmission of voice-to-voice communications when interconnected with said telephone line; and a reprogrammable central controller, connected to said speakerphone and to said automatic dialer, for controlling the operations of said home system in accordance with a selected set of reprogrammable options;

wherein said central controller, upon receipt of said first control signal, connects said automatic dialer to a telephone line and generates said command to cause said automatic dialer to dial said at least one telephone number, and wherein if no sound is detected after said telephone number is dialed and the call is answered, said central controller transmits a handshake tone, transmits a data string, hangs up, and then causes said automatic dialer to dial a second telephone number, and further comprising a plurality of audio and visual indicators to aid a programmer in programming said selected set of reprogrammable options, to indicate when an emergency signal has been received by said central controller, to indicate when a battery level is below a reference level, and to indicate whether said central controller will automatically answer incoming calls.

21. A programmable emergency communication system, for communicating between a home system and another party, comprising:

an automatic dialer programmed to dial at least one telephone number upon command;

means for transmitting a first control signal in response to an external condition;

a speakerphone coupled with a telephone line for enabling hands free reception and transmission of voice-to-voice communications when interconnected with said telephone line; and a reprogrammable central controller, connected to said speakerphone and to said automatic dialer, for controlling the operations of said home system in accordance with a selected set of reprogrammable options;

wherein said central controller, upon receipt of said first control signal, connects said automatic dialer to a telephone line and generates said command to cause said automatic dialer to dial said at least one telephone number, and wherein if no sound is detected after said telephone number is dialed and the call is answered, said central controller transmits a handshake tone, transmits a data string, hangs up, and then causes said automatic dialer to dial a second telephone number; and wherein if said dial tone is not detected, said central controller will hang up and listen for up to two more times for a dial tone and if no dial tone is detected, said central controller then causes said automatic dialer to go ahead and dial said one telephone number; and further comprising a plurality of audio and visual indicators to aid a programmer in programming said selected set of reprogrammable options, to indicate when an emergency signal has been received by said central controller, to indicate when a battery level is below a reference level, and to indicate whether said central controller will automatically answer incoming calls.

22. A programmable emergency communication system, for communicating between a home system and another party, comprising:

an automatic dialer programmed to dial at least one telephone number upon command;

means for transmitting a first control signal in response to an external condition;

a speakerphone coupled with a telephone line for enabling hands free reception and transmission of voice-to-voice communications when interconnected with said telephone line; and a reprogrammable central controller, connected to said speakerphone and to said automatic dialer, for controlling the operations of said home system in accordance with a selected set of reprogrammable options;

wherein said central controller, upon receipt of said first control signal, connects said automatic dialer to a telephone line and generates said command to cause said automatic dialer to dial said at least one telephone number, and wherein said central controller is placed into a programming mode, where said selected set of reprogrammable options may be programmed, when a telephone which has accessed said telephone line generates a certain sequence of tones, whereby said central controller may be programmed by a telephone connected to said central controller or by a remote telephone.

\* \* \* \* \*